US012628217B2

(12) United States Patent
Hwang et al.

(10) Patent No.: US 12,628,217 B2
(45) Date of Patent: May 12, 2026

(54) METHOD AND APPARATUS FOR PERFORMING BLOCK ACK IN MULTIPLE LINK OF WIRELESS LAN COMMUNICATION SYSTEM

(71) Applicants: ELECTRONICS AND TELECOMMUNICATIONS RESEARCH INSTITUTE, Daejeon (KR); KOREA NATIONAL UNIVERSITY OF TRANSPORTATION INDUSTRY-ACADEMIC COOPERATION FOUNDATION, Chungju-si (KR)

(72) Inventors: Sung Hyun Hwang, Daejeon (KR); Kyu Min Kang, Daejeon (KR); Jae Cheol Park, Daejeon (KR); Jin Hyung Oh, Sejong (KR); Su Na Choi, Daejeon (KR); Yong Ho Kim, Incheon (KR); Yong Su Gwak, Seoul (KR)

(73) Assignees: Electronics and Telecommunications Research Institute, Daejeon (KR); Korea National University of Transportation Industry-Academic Cooperation Foundation, Chungju-si (KR)

( * ) Notice: Subject to any disclaimer, the term of this patent is extended or adjusted under 35 U.S.C. 154(b) by 513 days.

(21) Appl. No.: 17/626,423

(22) PCT Filed: Jul. 10, 2020

(86) PCT No.: PCT/KR2020/009075
§ 371 (c)(1),
(2) Date: Jan. 11, 2022

(87) PCT Pub. No.: WO2021/010664
PCT Pub. Date: Jan. 21, 2021

(65) Prior Publication Data
US 2022/0322473 A1 Oct. 6, 2022

(30) Foreign Application Priority Data

Jul. 12, 2019 (KR) ........................ 10-2019-0084747
Apr. 9, 2020 (KR) ........................ 10-2020-0043492

(51) Int. Cl.
*H04W 76/15* (2018.01)
*H04L 1/1607* (2023.01)
(Continued)

(52) U.S. Cl.
CPC ........... *H04W 76/15* (2018.02); *H04L 1/1621* (2013.01); *H04W 80/02* (2013.01); *H04W 84/12* (2013.01)

(58) Field of Classification Search
CPC ..... H04W 76/11; H04W 76/15; H04W 76/20; H04W 76/22; H04W 72/005;
(Continued)

(56) References Cited

U.S. PATENT DOCUMENTS 8,842,624 B2 9/2014 Trachewsky
11,381,999 B2 * 7/2022 Patil ..................... H04W 76/15
(Continued)

FOREIGN PATENT DOCUMENTS

GB 2520692 A 6/2015
KR 10-2010-0129787 A 12/2010
(Continued)

OTHER PUBLICATIONS

Chu et al., "A-MPDU and BA", Date: Nov. 6, 2019, Doc.: IEEE 802.11-19/1856r0.

*Primary Examiner* — Huy D Vu
*Assistant Examiner* — Scott A Schlack
(74) *Attorney, Agent, or Firm* — Rabin & Berdo, P.C.

(57) ABSTRACT

The present invention relates to a method for operating a first communication node in a wireless local area network (WLAN) supporting a multi-link operation, comprising the steps of: setting a first transmit window size of a first link for transmitting a plurality of frames to a second communication node; transmitting the plurality of frames through the
(Continued)

first link; when the state of a channel detected through channel sensing in the second link is an idle state, setting a transmit opportunity (TXOP) in the channel; and when the transmit opportunity is set, performing an agreement with the second communication node on the size of a second transmit window for transmitting the plurality of frames. Therefore, it is possible to improve the performance of a communication system.

7 Claims, 22 Drawing Sheets

(51) Int. Cl.
  *H04W 80/02*         (2009.01)
  *H04W 84/12*         (2009.01)

(58) Field of Classification Search
  CPC ........... H04W 72/0426; H04W 72/048; H04W 72/085; H04W 72/1215; H04W 28/0221; H04W 28/0278; H04W 28/04; H04W 28/06; H04W 28/20; H04L 1/1614; H04L 1/1621; H04L 1/1819; H04L 61/2069; H04L 61/6022; H04L 5/0055; H04L 5/14
  See application file for complete search history.

(56)                References Cited

U.S. PATENT DOCUMENTS

| | | | | | |
|---|---|---|---|---|---|
| 11,464,027 | B2 * | 10/2022 | Seok | ....................... | H04L 47/34 |
| 11,632,752 | B2 * | 4/2023 | Huang | ................... | H04W 8/26 |
| | | | | | 370/254 |
| 12,113,609 | B2 * | 10/2024 | Cariou | ............... | H04L 27/2602 |
| 2009/0252143 | A1 | 10/2009 | Sridhara et al. | | |
| 2010/0182990 | A1 | 7/2010 | Trainin et al. | | |
| 2012/0188925 | A1 | 7/2012 | Lee et al. | | |
| 2015/0071051 | A1 | 3/2015 | Zhu et al. | | |
| 2016/0242195 | A1 | 8/2016 | Kwon et al. | | |
| 2016/0323881 | A1 | 11/2016 | Bhora et al. | | |
| 2018/0205502 | A1 | 7/2018 | Merlin et al. | | |
| 2018/0206174 | A1 | 7/2018 | Zhou et al. | | |
| 2018/0317242 | A1 | 11/2018 | Park et al. | | |
| 2019/0357190 | A1 | 11/2019 | Park et al. | | |
| 2020/0037288 | A1 * | 1/2020 | Huang | ................... | H04W 72/30 |
| 2020/0037324 | A1 * | 1/2020 | Chu | ..................... | H04L 1/0057 |
| 2020/0137626 | A1 * | 4/2020 | Huang | ................. | H04L 1/1819 |
| 2021/0007168 | A1 * | 1/2021 | Asterjadhi | ........ | H04W 52/0216 |
| 2021/0195578 | A1 * | 6/2021 | Huang | ................. | H04L 47/365 |
| 2021/0400662 | A1 * | 12/2021 | Huang | ............... | H04W 72/542 |

FOREIGN PATENT DOCUMENTS

| | | | |
|---|---|---|---|
| WO | 2015/065160 | A1 | 5/2015 |
| WO | 2015/137591 | A1 | 9/2015 |
| WO | 2016/028124 | A1 | 2/2016 |

* cited by examiner

TXOP = 3*(A-MPDU+BAR) TX + 5*xIFS + 2*BA Tx

METHOD AND APPARATUS FOR PERFORMING BLOCK ACK IN MULTIPLE LINK OF WIRELESS LAN COMMUNICATION SYSTEM

TECHNICAL FIELD

The present invention relates to a method for performing block acknowledgement (ACK) in a wireless LAN communication system, and more specifically, to a method, an apparatus, and a system for performing block acknowledgement in multi-link.

BACKGROUND ART

With the advancement of the information age, wireless LAN (WLAN) technology is in the spotlight. The wireless LAN technology is a technology that connects two or more devices by applying orthogonal frequency division multiplex (OFDM) technology. This allows users to continuously access a network while moving at any time in a place where a wireless network equipment exists, such as home or office. Most wireless LAN technologies today are based on the Institute of Electrical and Electronics Engineers (IEEE) 802.11 standards and are well known under the marketing name of 'Wi-Fi'. In particular, since the core technologies of the 4th industrial revolution era, such as artificial intelligence and autonomous driving technology, need to process a large amount of data in real time, the wireless LAN technology, which has a lower operating cost compared to cellular communications, is getting more attention, and many studies are currently being conducted.

The wireless LAN technology using a 2.4 GHz frequency band through the IEEE 802.11 started with supporting a speed of 1~2 megabits per second (Mbps), applying technologies such as frequency hopping, spread spectrum, and infrared communication. Thereafter, while supporting a speed of up to 54 Mbps, various technologies such as quality for service (QoS) improvement, compatibility with an access point (AP) protocol, security enhancement, radio resource measurement, wireless access vehicle environment, fast roaming, mesh network, interworking with external networks, wireless network management, etc. are being put into practice or being developed.

Among the current IEEE 802.11 standards, the IEEE 802.11a/b/g/n/ac/ad have been commercialized, and the IEEE 802.11b of them supports a communication speed of up to 11 Mbps while using frequency of the 2.4 GHz band. Since the IEEE 802.11a uses various communication protocols, it uses a 5 GHz band instead of the 2.4 GHz band having severe interferences, and improves the communication speed up to 54 Mbps by applying the OFDM technology. However, according to characteristics of radio waves, radio waves in the 5 GHz band have good straightness, while a diffraction performance is poor. Accordingly, the IEEE 802.11a has a short communication distance compared to the IEEE 802.11b.

The IEEE 802.11g uses the 2.4 GHz band like the IEEE 802.11b. It realizes a communication speed of up to 54 Mbps and shows good performance in terms of backward compatibility with the IEEE 802.11b.

The IEEE 802.11n is a technology developed to overcome the limitation of communication speed known as a weakness of the wireless LAN. It aims to increase the network speed and reliability and extend the operation distance of the wireless network. By applying multiple-inputs and multiple-outputs (MIMO) technology that uses multiple antennas at both ends of a transmitter and a receiver along with the OFDM technology, the IEEE 802.11n supports a high throughput (HT) with a maximum data processing rate of 540 Mbps or more. In addition, a coding scheme for transmitting multiple duplicate copies was also adopted to increase data reliability.

The IEEE 802.11ac was developed to support a higher throughput (i.e., very high throughput (VHT)) than the high throughput (HT) having a maximum data throughput of 540 Mbps or more. Therefore, the IEEE 802.11ac selects the 5 GHz band as a center frequency band, and configures a wide bandwidth (i.e., 80 MHz~160 MHz) to support the high data throughput. Also, the IEEE 802.11ac has backward compatibility with the existing products by supporting not only the 5 GHz band but also the existing 2.4 GHz band. The IEEE 802.11ac theoretically achieves a minimum speed of 1 Gbps as a wireless LAN speed of multiple terminals, and a maximum single link speed of at least 500 Mbps. These speeds are realized by introducing enhanced wireless interface technologies, such as a wider radio frequency bandwidth (up to 160 MHz), more MIMO spatial streams (up to 8), multi-user MIMO, and high-order modulation (up to 256 QAM).

The IEEE 802.11ad can transmit data using a 60 GHz band instead of the existing 2.5 GHz/5 GHz. Since the IEEE 802.11ad uses beamforming technology to support a speed of up to 7 Gbps, it is suitable for a large amount of data or a high bit rate video streaming of an uncompressed HD video. Due to the low diffraction property according to the frequency characteristics, the IEEE801.11ad may be used only in a short distance because the radio waves thereof are difficult to pass through an obstacle.

The IEEE 802.11ax aims to increase an average transmission rate per user by at least 4 times or more by supporting functions for implementing high-speed wireless technology in a dense environment. To achieve this goal, the multi-User MIMO (MU-MIMO) and OFDMA technology may be utilized. In particular, by expanding the size of the Fast Fourier Transform (FFT) of the OFDM and increasing the density of subcarriers, it has greatly improved the robustness and performance in multi-path fading environments and outdoors.

The IEEE 802.11be is the next generation technology of the IEEE 802.11ax, and aims for a throughput of 30 Gbps or more and low latency. To achieve this, technologies such as Multi-AP, Multi-Link, and Hybrid Automatic Repeat Request (HARM) can be used. For the multi-link operation, only operations for adjacent channels in the same band are described, and operations for channels in other bands have not been defined.

Meanwhile, the prior arts of the present invention have been prepared to enhance understanding of the background of the present invention, and may include contents other than the prior arts already known to ordinary skilled persons in the field to which the present invention belongs.

DISCLOSURE

Technical Problem

An objective of the present invention for solving the above-described problem is to define a multi-link operation and solve the problems that could not operate based on multiple links. Specifically, the present invention provides a method and an apparatus for improving performance of a block acknowledgement procedure in a multi-link method in which one sequence number, one reordering buffer, and one scoreboard are shared.

Technical Solution

An exemplary embodiment of the present invention for achieving the objective, as an operation method of a first communication node in a WLAN supporting a multi-link operation, may comprise: setting a first transmit window size of a first link for transmitting a plurality of frames to a second communication node; transmitting the plurality of frames through the first link; when a state of a channel detected through channel sensing on a second link is an idle state, configuring a transmit opportunity (TXOP) in the channel; and when the transmit opportunity is configured, agreeing a second transmission window size for transmitting the plurality of frames with the second communication node.

The operation method may further comprise, when the transmit opportunity is configured, stopping transmission operations through the first link.

The second transmit window size may be smaller than the first transmit window size.

The agreeing of the second window size may comprise: transmitting to the second communication node a block ACK request (BAR) frame including MAC addresses of respective nodes included in the first communication node; and receiving from the second communication node a block ACK (BA) frame that is a response to the BAR frame.

The BAR frame may be transmitted through the first link.

The BA frame may be received through the first link and the second link, respectively, and the BA frame received through the first link and the BA frame received through the second link may be identical.

The BAR frame may be an Add Block ACK (ADDBA) request frame for adding the MAC address or a Delete Block ACK (DELBA) request frame for removing the MAC address.

The operation method may further comprise adjusting transmit window sizes of the first link and the second link to the second transmit window size.

The operation method may further comprise: transmitting a first frame to the second communication node through the first link based on the second transmit window size; and transmitting a second frame to the second communication node through the second link based on the second transmit window size.

Another exemplary embodiment of the present invention for achieving the objective, as an operation method of a first communication node in a WLAN supporting a multi-link operation, may comprise: configuring a first link and a second link between the first communication node and a second communication node; transmitting a first frame including a plurality of PDUs to the second communication node through the first link; identifying a transmission completion time of a last PDU among the plurality of PDUs; and transmitting a block ACK request (BAR) frame to the second communication node before the transmission completion time of the last PDU.

The last PDU may be a PDU last transmitted in a transmit opportunity (TXOP) configured in the first link.

The operation method may further comprise: transmitting a second frame to the second communication node through the second link; and stopping transmission of a PDU included in the second frame at the transmission completion time of the last PDU.

The BAR frame may be transmitted through the second link.

The operation method may further comprise receiving from the second communication node a block ACK (BA) frame that is a response to the BAR frame, wherein the BA frame is received through the first link and the second link, respectively, and the BA frame received through the first link and the BA frame received through the second link are identical.

An exemplary embodiment of the present invention for achieving another objective, as a first communication node in a WLAN supporting a multi-link operation, may comprise: a processor; a memory electronically communicating with the processor; and instructions stored in the memory, wherein when executed by the processor, the instructions may cause the first communication node to: set a first transmit window size of a first link for transmitting a plurality of frames to a second communication node; transmit the plurality of frames through the first link; when a state of a channel detected through channel sensing on a second link is an idle state, configure a transmit opportunity (TXOP) in the channel; and when the transmit opportunity is configured, agree a second transmission window size for transmitting the plurality of frames with the second communication node.

When the transmit opportunity is configured, the instructions may further cause the first communication node to stop transmission operations through the first link.

The second transmit window size may be smaller than the first transmit window size.

In the agreeing of the second window size, the instructions may further cause the first communication node to: transmit to the second communication node a block ACK request (BAR) frame including MAC addresses of respective nodes included in the first communication node; and receive from the second communication node a block ACK (BA) frame that is a response to the BAR frame.

The instructions may further cause the first communication node to adjust transmit window sizes of the first link and the second link to the second transmit window size.

Advantageous Effects

According to the present invention, provided is a multi-link method for sharing one sequence number, one reordering buffer, and one scoreboard in a wireless LAN using multiple links. Therefore, even when the existing block ACK execution scheme is applied, the performance of the terminal based on IEEE 802.11be is not reduced, but the performance of the terminal can be improved.

The present invention can be applied to a communication device using a WLAN (all communication devices including a terminal, a station, a wireless access point, and an access management device).

DESCRIPTION OF DRAWINGS

FIG. 4 is a timing diagram illustrating a first exemplary embodiment of an operation method of a communication node based on an EDCA.

FIG. 5 is a conceptual diagram illustrating a simultaneous multi-link access (MLA) method.

FIG. 13 is a conceptual diagram illustrating a multi-link transmission method performed in an independent MLA having three links.

Figure 23:
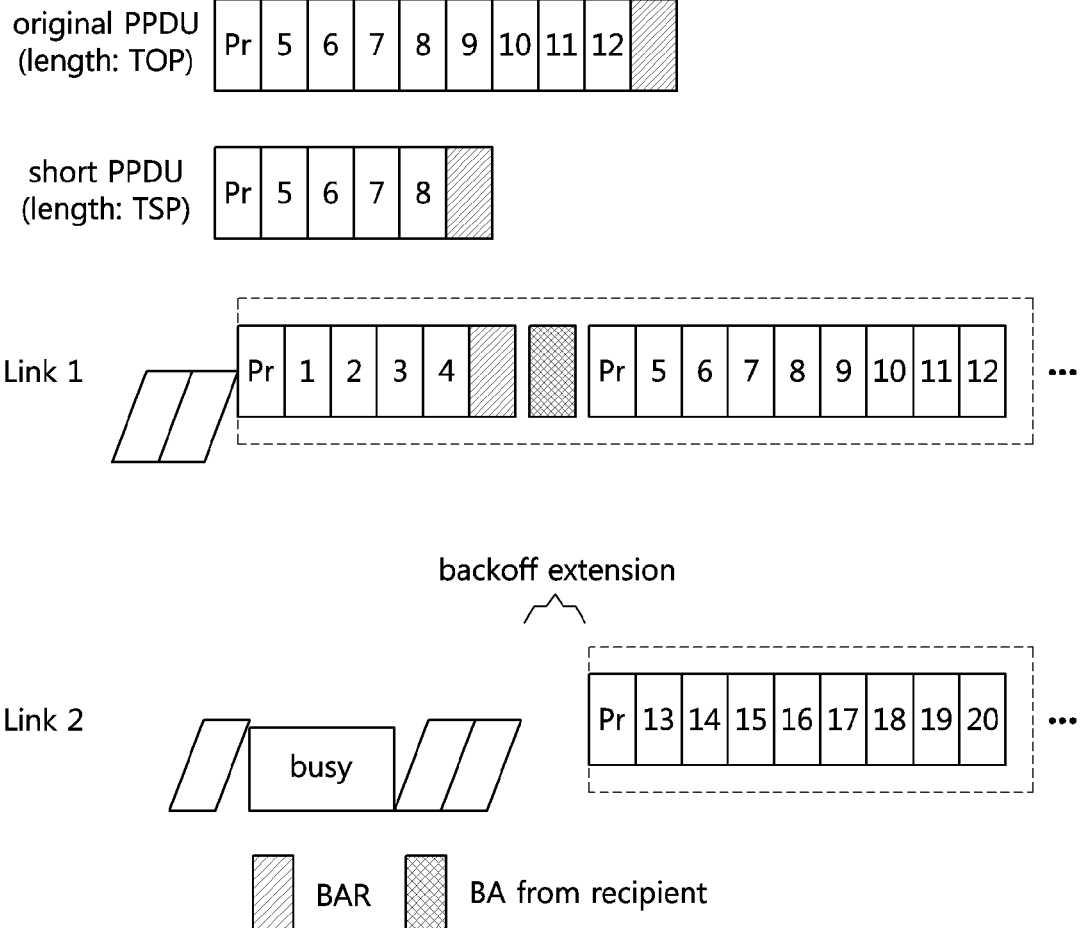

FIG. 23 is a conceptual diagram illustrating a synchronization method when a short busy period occurs in a link 2 after a communication node calculates a remaining value in case that a channel access to a link 1 is successfully performed.

Figure 24:
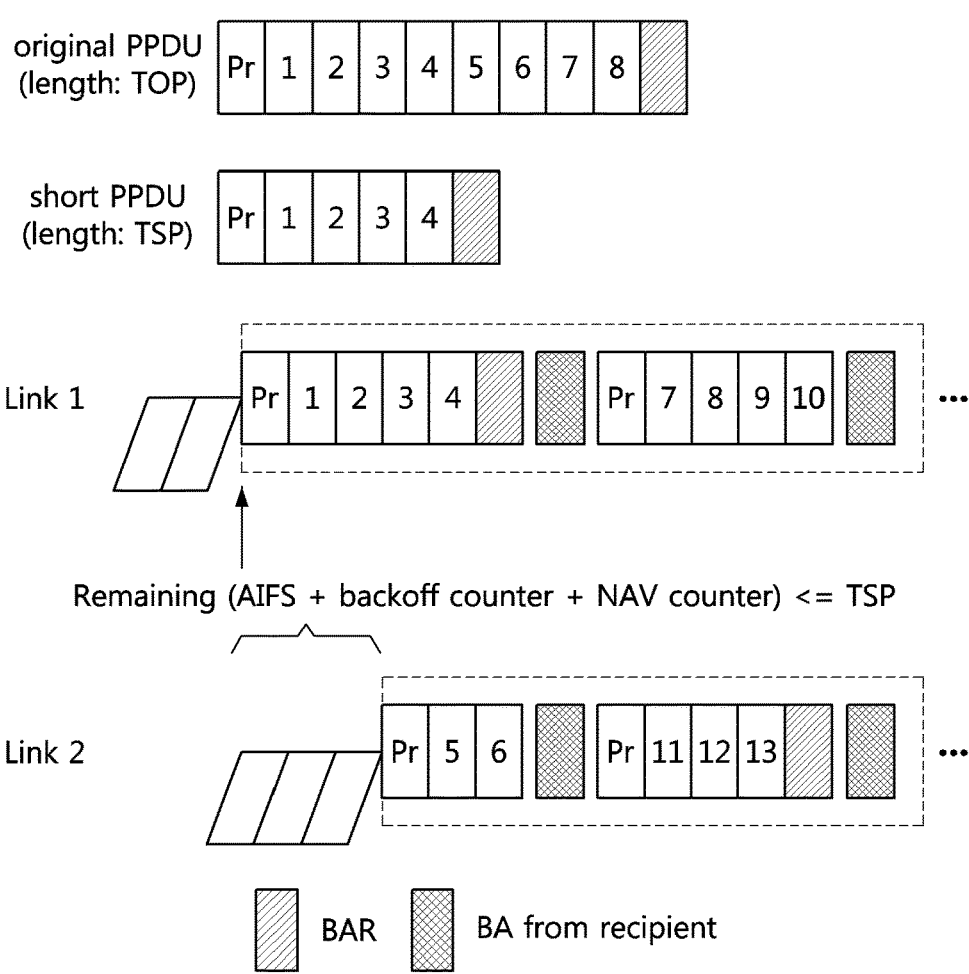

FIG. 24 is a conceptual diagram illustrating an exemplary embodiment in which MSDUs having new sequence numbers are included in a PPDU having a length of (TSP-remaining value (AIFS+backoff counter+NAV counter)).

Figure 25:
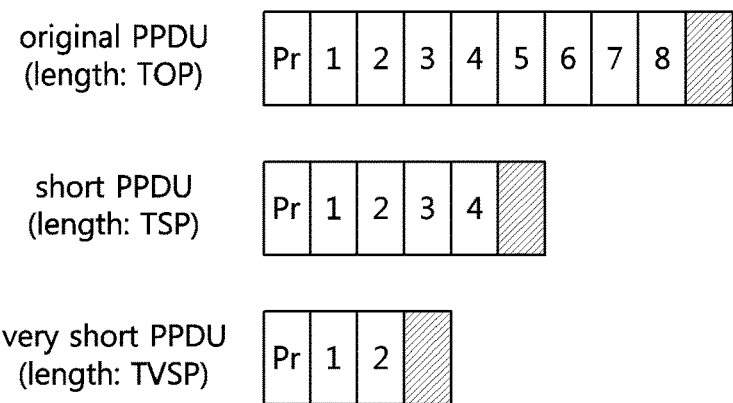

FIG. 25 is a conceptual diagram illustrating a method for a communication node to generate and transmit PPDUs having various lengths by optimizing the PPDUs.

[Modes of the Invention]

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present invention will be described in detail with reference to the accompanying drawings. In describing the present invention, to facilitate the entire understanding, like numbers refer to like elements throughout the description of the figures and the repetitive description thereof will be omitted.

In the following, a wireless communication network to which exemplary embodiments according to the present invention are applied will be described. The wireless communication network to which the exemplary embodiments according to the present invention are applied is not limited to the contents described below, and the exemplary embodiments according to the present invention may be applied to various wireless communication networks.

Figure 1:
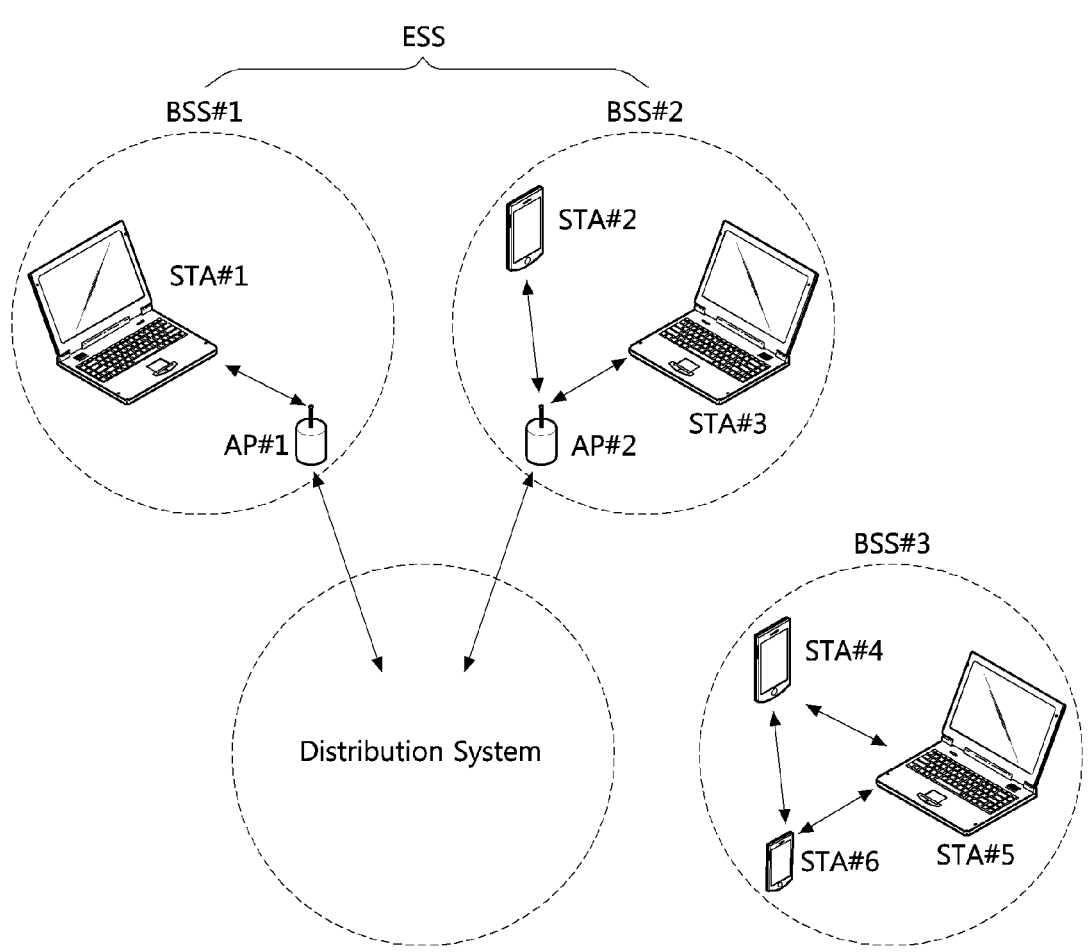
FIG. 1 is a conceptual diagram illustrating a first exemplary embodiment of a WLAN system.

FIG. 1 is a conceptual diagram illustrating a first exemplary embodiment of a WLAN system.

As shown in FIG. 1, a WLAN system may include at least one basic service set (BSS). The BSS denotes a set of STAs (e.g., STA1, STA2 (i.e., AP1), STA3, STA4, and STA5 (i.e., AP2), STA6, STA7, and STA8) capable of communicating with each other through successful synchronization, and is not a concept that denotes a specific area. In exemplary embodiments below, a station that performs a function of an access point may be referred to as an 'access point (AP)', and a station that does not perform the function of an access point may be referred to as a 'non-AP station' or simply 'station'.

The BSSs may be classified as infrastructure BSSs and independent BSSs (IBSSs). Here, a BSS1 and a BSS2 may be infrastructure BSSs, and a BSS3 may be an IBSS. The BSS1 may include the station STA1, the access point STA2 (i.e., AP1) that provides a distribution service, and a distribution system (DS) that connects the plurality of access points STA2 (i.e., AP1) and STA5 (i.e., AP2). In the BSS1, the access point STA2 (i.e., AP1) may manage the STA1.

The BSS2 may include the STA3 and the STA4, the access point STA5 (i.e., AP2) that provides the distribution service, and the distribution system that connects the plurality of access points STA2 (i.e., AP1) and STA5 (i.e., AP2). In the BSS2, the access point STA5 (i.e., AP2) may manage the STA3 and the STA4.

The BSS3 may be an IBSS operating in an ad-hoc mode. In the BSS3, there is no AP which is an entity that performs a management function at a center. In other words, in the BSS3, the stations STA6, STA7, and STA8 may be managed in a distributed manner. In the BSS3, all the stations STA6, STA7, and STA8 may be mobile stations and may be not allowed to connect to the DS, thus constituting a self-contained network.

The access points STA2 (i.e., AP1) and STA5 (i.e., AP2) may provide access to the DS through a wireless medium for the stations STA1, STA3, and STA4 connected thereto. Communications between the stations STA1, STA3, and STA4 in the BSS 1 or the BSS2 are generally performed through the access points STA2 (i.e., AP1) and STA5 (i.e., AP2), but when a direct link is established, direct communications between the stations STA1, STA3, and STA4 are also possible.

A plurality of infrastructure BSSs may be interconnected via a DS. A plurality of BSSs connected through a DS is referred to as an extended service set (ESS). The stations (e.g., STA1, STA2 (i.e., AP1), STA3, STA4, and STA5 (i.e., AP2)) included in an ESS may communicate with each other, and a station (e.g., STA1, STA3, or STA4) in the ESS may move from one BSS to another BSS while performing seamless communication.

The DS is a mechanism for an AP to communicate with another AP, in which the AP may transmit a frame for stations connected to a BSS managed by the AP or may transmit a frame for an arbitrary station having moved to another BSS. Also, the AP may exchange frames with an external network, such as a wired network. Such the DS is not necessarily a network, and has any form capable of providing a predetermined distribution service defined in an IEEE 802.11 standard. For example, a DS may be a wireless network, such as a mesh network, or a physical structure that connects APs with each other. Each of the communication nodes STA1, STA2 (i.e., AP1), STA3, STA4, STA5 (i.e., AP2), STA6, STA7, and STA8 included in the WLAN system may be configured as follows.

Figure 2:
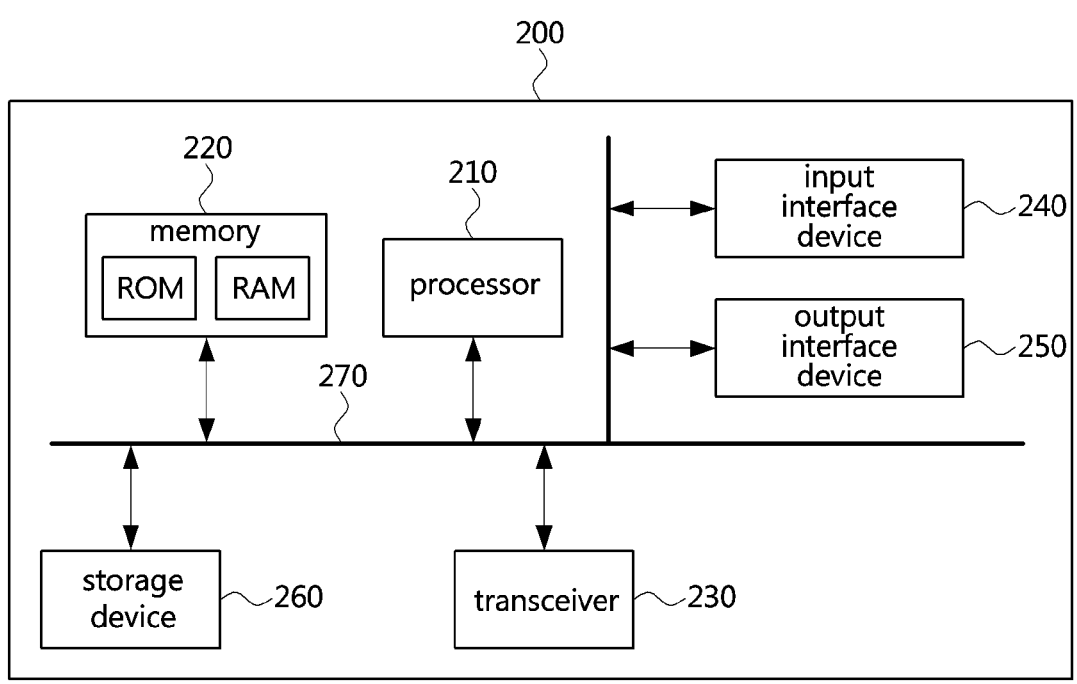
FIG. 2 is a block diagram illustrating a first exemplary embodiment of a communication node constituting a WLAN system.

FIG. 2 is a block diagram illustrating a first exemplary embodiment of a communication node constituting a WLAN system.

As shown in FIG. 2, a communication node 200 may comprise at least one processor 210, a memory 220, and a transceiver 230 connected to a network for performing communications. The transceiver 230 may also be referred to as a 'radio frequency (RF) unit', 'RF module', or the like. Also, the communication node 200 may further comprise an input interface device 240, an output interface device 250, a storage device 260, and the like. Each component included in the communication node 200 may communicate with each other as connected through a bus 270.

However, each of the components included in the communication node 200 may be connected to the processor 210 via a separate interface or a separate bus rather than the common bus 270. For example, the processor 210 may be connected to at least one of the memory 220, a plurality of transceivers (e.g., a transceiver #1 230-1, . . . , a transceiver #n 230-n), the input interface device 240, the output interface device 250, and the storage device 260 via a dedicated interface. Meanwhile, when the communication node 200 is an MLD, each of the plurality of transceivers of the communication node 200 may perform frame transmission and reception operations.

The processor 210 may execute at least one instruction stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may include at least one of a volatile storage medium and a non-volatile storage medium. For example, the memory 220 may comprise at least one of read-only memory (ROM) and random access memory (RAM). Meanwhile, in the WLAN system, an association procedure may be performed as follows.

Figure 3:
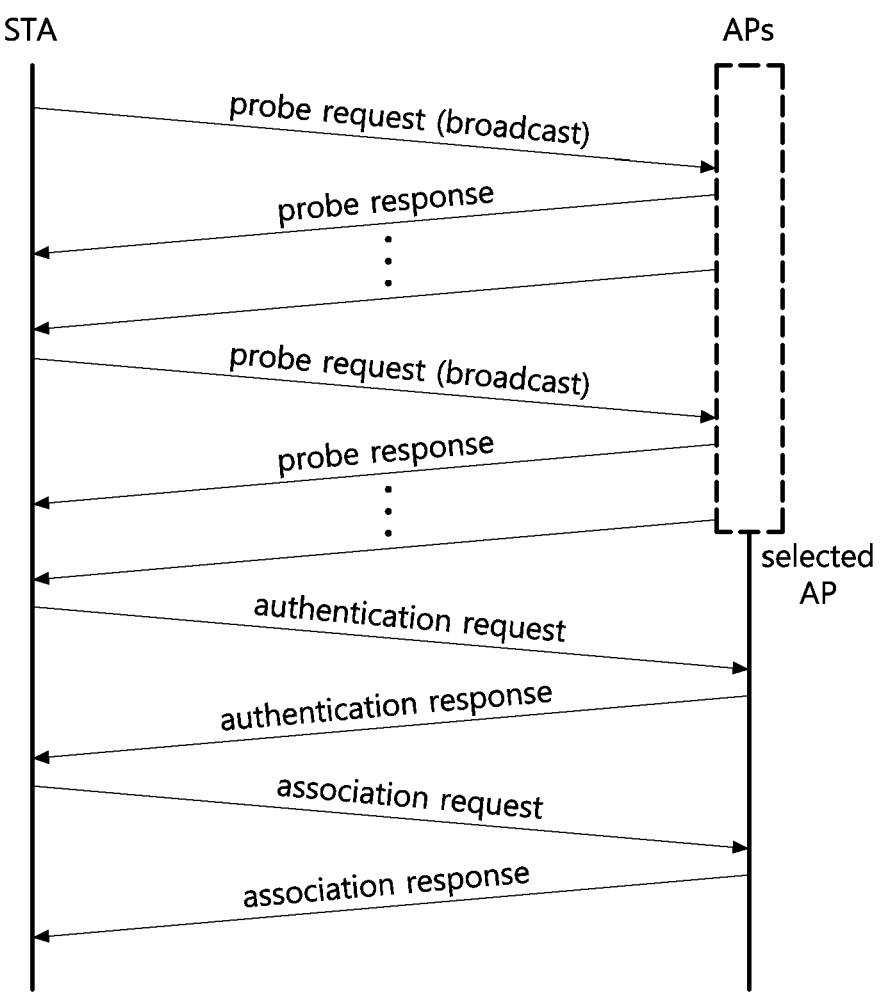
FIG. 3 is a sequence chart illustrating an association procedure of a station in a WLAN system.

FIG. 3 is a sequence chart illustrating an association procedure of a station in a WLAN system.

As shown in FIG. 3, an association procedure of a STA in an infrastructure BSS may be generally divided into a probe step of probing an AP, an authentication step for authentication with the probed AP, and an association step of associating with the authenticated AP.

The STA may first probe neighboring APs through a probe process. The probe process may be performed in a passive scanning scheme or an active scanning scheme. The passive scanning scheme may be performed by overhearing beacons transmitted by the neighboring APs. On the other hand, the active scanning scheme may be performed by broadcasting a probe request frame. The APs receiving the probe request frame may transmit probe response frames corresponding to the probe request frame to the STA. The STA may recognize the presence of the neighboring APs by receiving the probe response frames.

When the neighboring APs are detected, the STA may perform an authentication with a probed AP. In this case, the STA may perform an authentication with a plurality of probed APs. Authentication algorithms conforming to the IEEE 802.11 standard are classified into an open system algorithm for exchanging two authentication frames and a shared key algorithm for exchanging four authentication frames.

The STA may transmit an authentication request frame based on the authentication algorithms according to the IEEE 802.11 standards, and the STA may complete authentication with an AP by receiving an authentication response frame from the AP, which is a response to the authentication request frame.

When the authentication with the AP is completed, the STA may perform an association step with the AP. In this case, the STA may select one AP among the APs which have performed the authentication step with itself, and perform the association step with the selected AP. That is, the STA may transmit an association request frame to the selected AP and may receive an association response frame that is a response to the association request frame from the selected AP, so that the association with the selected AP can be completed.

Meanwhile, a communication node (e.g., an access point, a station, etc.) belonging to the WLAN system may perform transmission and reception of a frame based on a point coordination function (PCF), a hybrid coordination function (HCF), an HCF controlled channel access (HCCA), a distributed coordination function (DCF), and/or an enhanced distributed channel access (EDCA).

The frame in the WLAN system may be classified into a management frame, a control frame, and a data frame. The management frame may be classified into an association request frame, an association response frame, a reassociation request frame, a reassociation response frame, a probe request frame, a probe response frame, a beacon frame, and an association. It may include a disassociation frame, an authentication frame, a deauthentication frame, an action frame, and the like.

The control frame may be classified into an acknowledgment (ACK) frame, a block ACK request (BAR) frame, a block ACK (BA) frame, a power saving (PS)-Poll frame, a request-to-send (RTS) frame, a clear-to-send (CTS) frame, and the like. The data frame may be classified into a quality of service (QoS) data frame and a non-QoS data frames. The QoS data frame may indicate a data frame for which transmission according to QoS is required, and the non-QoS data frame may indicate a data frame for which transmission according to QoS is not required.

Meanwhile, in the WLAN system, a communication node (e.g., an access point or a station) may operate based on the EDCA.

Figure 4:
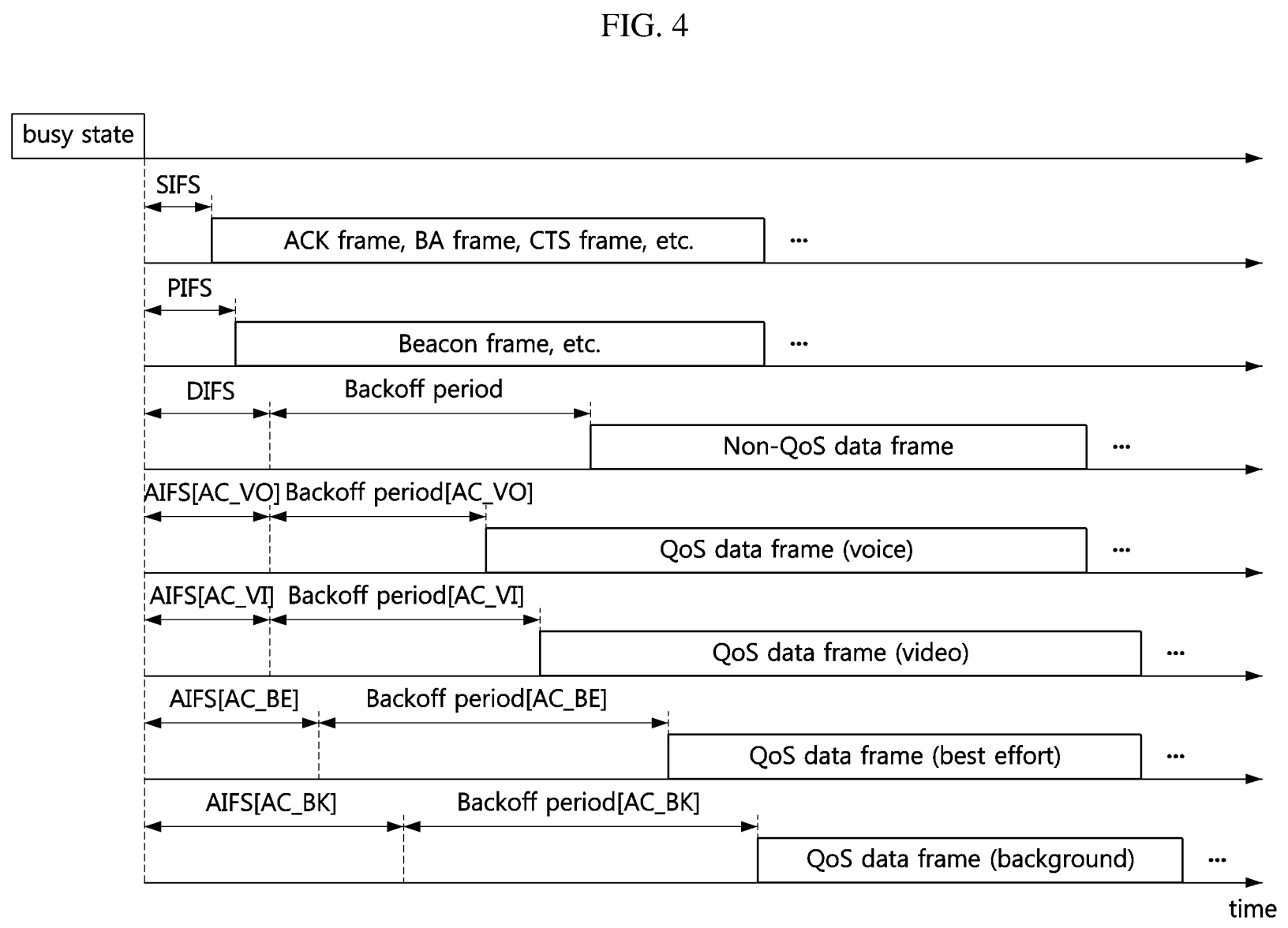

FIG. 4 is a timing diagram illustrating a first exemplary embodiment of an operation method of a communication node based on an EDCA.

As shown in FIG. 4, a communication node that wants to transmit a control frame (or a management frame) may perform a monitoring operation (e.g., carrier sensing operation) on a channel state for a predetermined period (e.g., a short interframe space (SIFS) or a PCF IFS (PIFS)). When the channel state is determined to be an idle state for the predetermined period (e.g., SIFS or PIFS), the communication node may transmit a control frame (or a management frame). For example, the communication node may transmit an ACK frame, a BA frame, a CTS frame, or the like when the channel state is determined to be an idle state for the SIFS. Also, the communication node may transmit a beacon frame or the like when the channel state is determined to be an idle state for the PIFS. On the other hand, when the channel state is determined to be busy for the predetermined period (e.g., SIFS or PIFS), the communication node may not transmit a control frame (or a management frame). Here, the carrier sensing operation may be referred to as a 'clear channel assessment (CCA) operation'.

A communication node that wants to transmit a non-QoS data frame may perform a monitoring operation (e.g., carrier sensing operation) on a channel state for a DCF IFS (DIFS). When the channel state is determined to be idle for the DIFS, the communication node may perform a random backoff procedure. For example, the communication node may select a backoff value (e.g., backoff counter) within a contention window according to the random backoff procedure, and may perform the monitoring operation (e.g., carrier sensing operation) for a period corresponding to the selected backoff value. The communication node may transmit a non-QoS data frame when the channel state is determined to be an idle state for the backoff period. A communication node that wants to transmit a QoS data frame may perform a monitoring operation (e.g., carrier sensing operation) on a channel state for an arbitration IFS (AIFS). When the channel state is determined to be idle for the AIFS, the communication node may perform a random backoff procedure. The AIFS may be set according to an access category (AC) of a data unit (e.g., a protocol data unit (PDU)) included in the QoS data frame. The AC of the data unit may be as shown in Table 1 below.

TABLE 1

| Priority | AC | Description |
|---|---|---|
| Lowest | AC_BK | Background |
| . | AC_BE | Best effort |
| . | AC_VI | Video |
| Highest | AC_VO | Voice |

AC_BK may indicate background data, AC_BE may indicate data transmitted in a best effort manner, AC_VI may indicate video data, and AC_VO may indicate voice data. For example, the length of the AIFS for the QoS data frame corresponding to each of AC_VO and AC_VI may be set equal to the length of the DIFS. The length of the AIFS for the QoS data frame corresponding to AC_BE and AC_BK may be set longer than the length of the DIFS. Here, the length of the AIFS for the QoS data frame corresponding to AC_BK may be set longer than the length of the AIFS for the QoS data frame corresponding to AC_BE.

In the random backoff procedure, the communication node may select a backoff value (e.g., backoff counter) within a contention window according to the AC of the QoS data frame. The contention window according to the AC may be as shown in Table 2 below. CWmin may indicate the minimum value of the contention window, CWmax may indicate the maximum value of the contention window, and each of the minimum and maximum values of the contention window may be expressed by the number of slots.

TABLE 2

| AC | $CW_{min}$ | $CW_{max}$ |
|---|---|---|
| AC_BK | 31 | 1023 |
| AC_BE | 31 | 1023 |
| AC_VI | 15 | 31 |
| AC_VO | 7 | 15 |

The communication node may perform a monitoring operation (e.g., carrier sensing operation) on the channel state for the backoff period, and transmit the QoS data frame when the channel state is determined to be in an idle state for the backoff period.

Hereinafter, WLAN multi-channel operation methods in a communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a non-AP station is described, the corresponding AP may perform an operation corresponding to the operation of the non-AP station. Conversely, when an operation of the AP is described, the corresponding non-AP station may perform an operation corresponding to the operation of the AP.

In the following, a wireless communication network to which exemplary embodiments according to the present invention are applied will be described. The wireless communication network to which the exemplary embodiments according to the present invention are applied is not limited to the contents described below, and the exemplary embodiments according to the present invention may be applied to various wireless communication networks.

Figure 5:
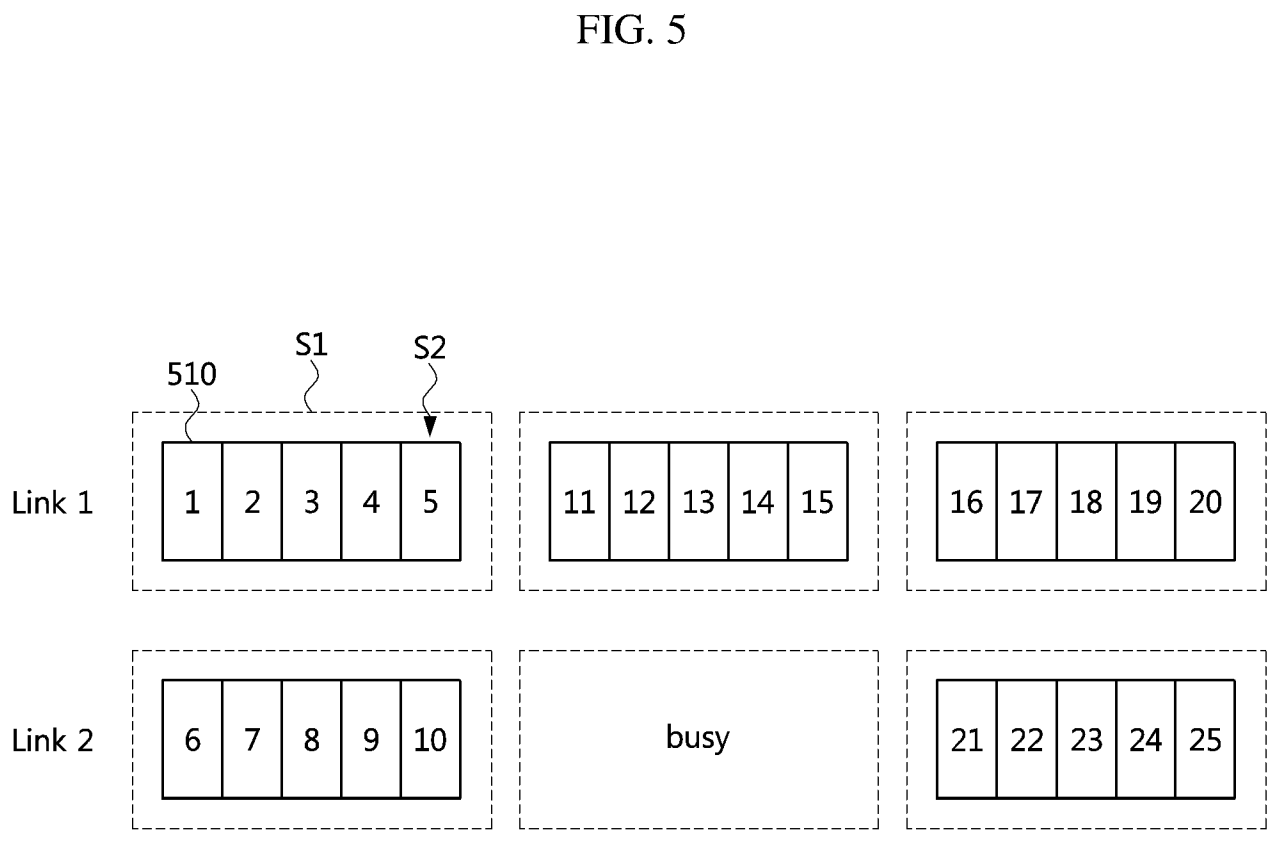

FIG. 5 is a conceptual diagram illustrating a simultaneous multi-link access (MLA) method.

Referring to FIG. 5, a rectangle S1 indicated by a dotted line may denote a transmit opportunity (hereinafter, referred to as a 'TXOP') of each link, and a rectangle S2 indicated by a solid line may denote a quality of service (QoS) data frame. In addition, a number 510 described in the data frame may mean a sequence number (hereinafter, referred to as a 'SN'). When a media access control (MAC) service data unit (MSDU) is transmitted by a logical link control (LLC) layer of an originator, a SN may be assigned in order, and the corresponding MSDU may become a QoS data frame, and be transmitted through each link.

The simultaneous multi-link access (hereinafter referred to as 'Simultaneous MLA') method may assume that a start point and a length of the TXOP are the same in all links. This method may be a method of making the start and end points of all TXOPs match after channel access is performed on all links.

Meanwhile, when the SNs of the data frames to be transmitted through each link are arranged as shown in FIG. 5, at the time of the first TXOP at which data frames are simultaneously transmitted through a link 1 and a link 2, data frames having later SNs (e.g., 6-10) transmitted through the link 2 may stay in a reordering buffer of a recipient until a data frame having a SN 5 is transmitted through the link 1.

The reordering buffer of the recipient may preferentially transmit a data frame having a smaller SN to the LLC layer. That is, the reordering buffer may play a role of correcting transmission orders of the data frames. Meanwhile, when the data frame having the SN 5 is transmitted through the link 1, the data frames having the later SNs 6 to 10 may be transmitted from the reordering buffer of the recipient to the LLC layer. To this end, the reordering buffer may store packets of the link through which the packets of the later SNs are received when a simultaneous MLA session is started. Thereafter, the reordering buffer may combine packets of the first link and packets stored in the buffer. That is, the reordering buffer may be divided equally as many as the number of links, and the received packets may be stored in a buffer region of the corresponding link.

Figure 6:
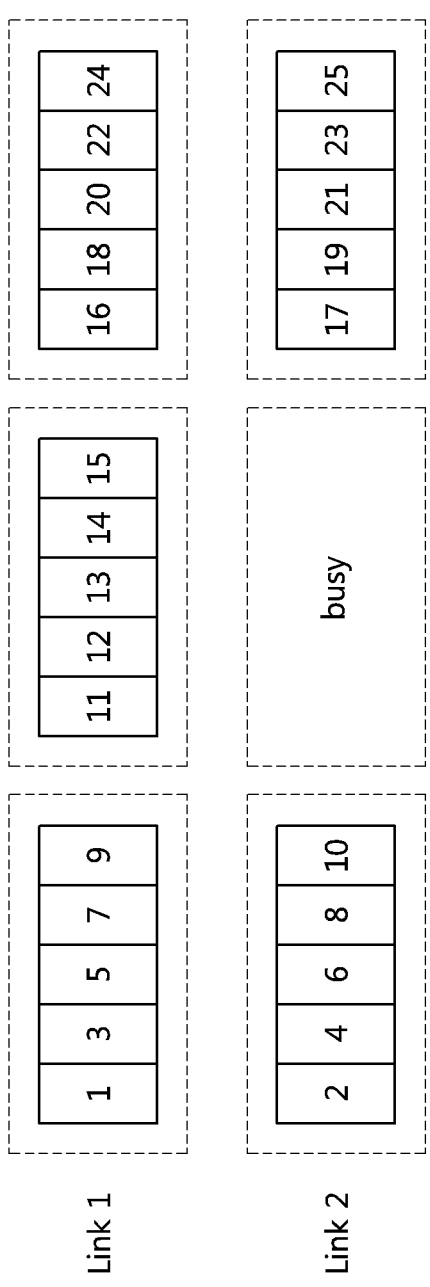
FIG. 6 is a conceptual diagram illustrating an operation performed in a reordering buffer in a simultaneous MLA.

FIG. 6 is a conceptual diagram illustrating an operation performed in a reordering buffer in a simultaneous MLA.

Referring to FIG. 6, for efficient use of the reordering buffer, SNs of QoS data frames transmitted through multiple links may be alternately arranged on the respective links. Through this scheme, a difference in SNs between data frames transmitted through multiple links may be minimized. Accordingly, an operation of combining MSDUs correctly received at the recipient LLC in order of the SNs and an operation of transmitting them may be quickly performed, so that the reordering buffer can be efficiently used.

Figure 7:
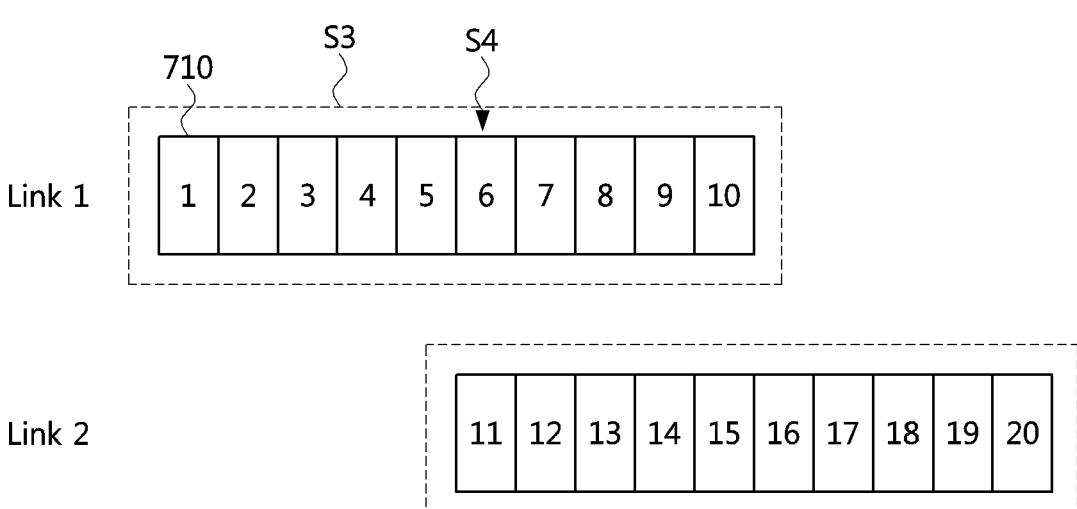
FIG. 7 is a conceptual diagram illustrating an independent multi-link access method.

FIG. 7 is a conceptual diagram illustrating an independent multi-link access method.

Referring to FIG. 7, a rectangle S3 indicated by a dotted line may denote a transmit opportunity (hereinafter, referred to as a 'TXOP') of each link, and a rectangle S4 indicated by a solid line may denote a quality of service (QoS) data frame. In addition, a number 710 described in the data frame may mean a sequence number (hereinafter, referred to as a 'SN'). When a MAC service data unit (MSDU) is transmitted by a logical link control (LLC) layer of an originator, a SN may be assigned in order, and the corresponding MSDU may become a QoS data frame, and be transmitted through each link.

The independent multi-link access (hereinafter referred to as 'Independent MLA') method may assume that a start point and a length of the TXOP are not the same in all links. This method may be a method in which a data frame is transmitted after independent channel access to each link is performed.

Figure 8:
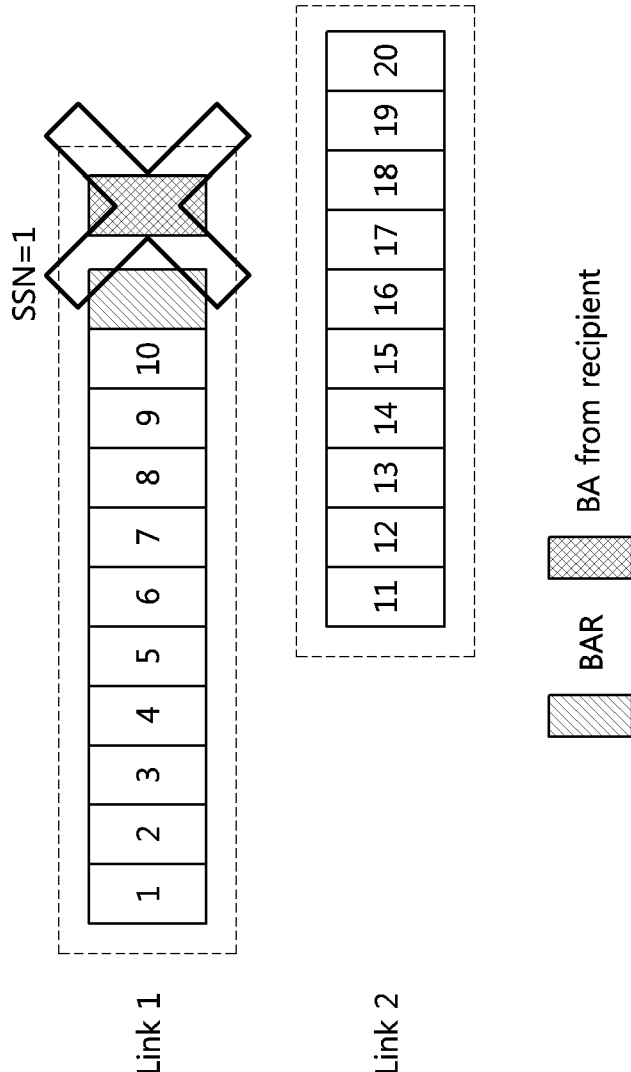
FIG. 8 is a conceptual diagram illustrating a problem that may occur when a communication node not supporting a full-duplex scheme among communication nodes supporting multi-links performs an independent MLA.

FIG. 8 is a conceptual diagram illustrating a problem that may occur when a communication node not supporting a full-duplex scheme among communication nodes supporting multi-links performs an independent MLA.

Referring to FIG. 8, an originator may perform a procedure of receiving a block ack. When transmission of a QoS data frame block is completed in the link 1 (i.e., when transmission of a data frame having a SN 10 is completed), the originator may transmit a block ACK request (BAR) (e.g., a BAR having a starting sequence number (SSN) of 1) having the smallest SSN in the block. Thereafter, the originator may receive a block ACK (BA) from a recipient.

Meanwhile, communication nodes may perform communications in a half-duplex scheme instead of the full-duplex scheme. When a communication node performs communications in the half-duplex scheme, it may not be able to simultaneously take a transmission mode and a reception mode. Accordingly, even though the originator transmits the BAR to the recipient through the link 1, the transmission through the link 2 is continuing, and thus the BA may not be received from the recipient. Therefore, in order for the originator to receive the BA from the recipient, it may have to stop transmitting data frames on all links and wait in the reception mode. In addition, when the recipient performs communications in the half-duplex scheme, even if the originator transmits the BAR through the link 1, the BA may not be transmitted through the link 1 because reception through the link 2 continues. Therefore, in order for the originator to transmit the BA, it may have to stop receiving data frames on all links and switch to the transmission mode. The half-duplex scheme may mean a non-simultaneous transmit and receive (STR) scheme.

Figure 9:
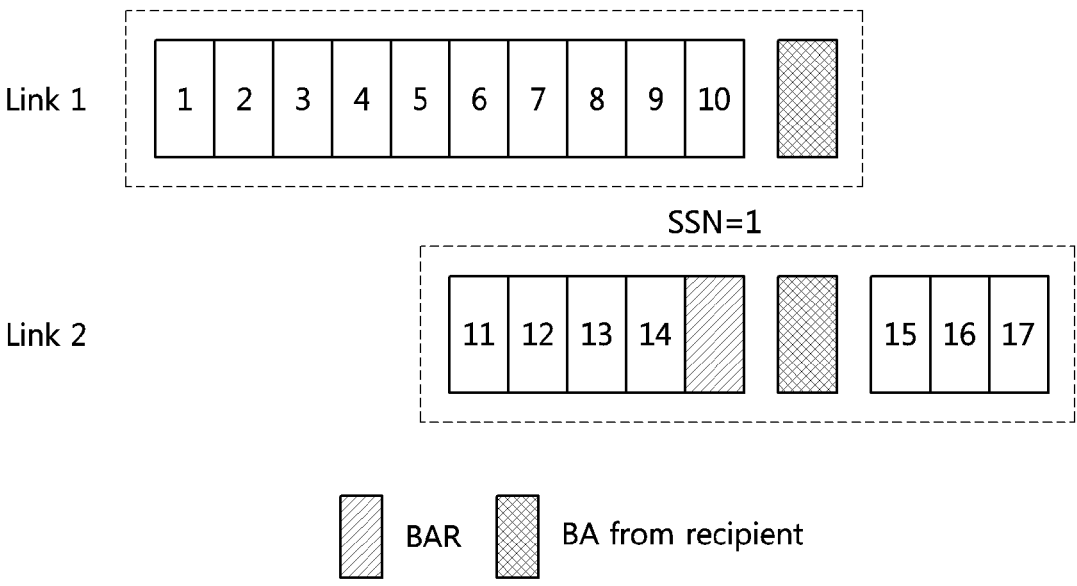
FIG. 9 is a conceptual diagram illustrating a method in which a non-STR communication node not supporting a full-duplex scheme among communication nodes supporting multiple links performs an independent MLA to transmit a BAR and a BA.

FIG. 9 is a conceptual diagram illustrating a method in which a non-STR communication node not supporting a full-duplex scheme among communication nodes supporting multiple links performs an independent MLA to transmit a BAR and a BA.

Referring to FIG. 9, an originator may transmit a BAR having the smallest SSN (e.g., a BAR having a SSN of 1) in a corresponding block to a recipient when one data block ends or a TXOP ends. To this end, a TXOP to which a time for transmitting an intermediate BAR and BA is added may have to be configured in a link configured later.

The BAR may be configured to be transmitted in only one of all transmission links. In addition, dummy data (padding) may be transmitted so that end points of data blocks transmitted on all links are matched. For example, in the case of FIG. 9, a data frame having SN 10 may be a dummy data frame.

The recipient may transmit a BA for the BAR to the originator. In this case, the BA may be transmitted through all available links. On the other hand, if there is no more data to be transmitted after the originator transmits the BAR to the recipient, the originator may transmit an indicator indicating the last to the recipient by inserting the indicator in the BAR. In this case, the recipient may transmit a BA to the originator through the link through which the BAR is received.

In FIG. 9, all the BAs transmitted from the recipient after the originator transmits the BAR may be duplicates of the same BA. On the other hand, the recipient may not transmit the BA by duplicating it according to a condition. For example, the recipient may transmit a BA through a specific link, and may transmit a null packet or a dummy data frame through another link.

Figure 10:
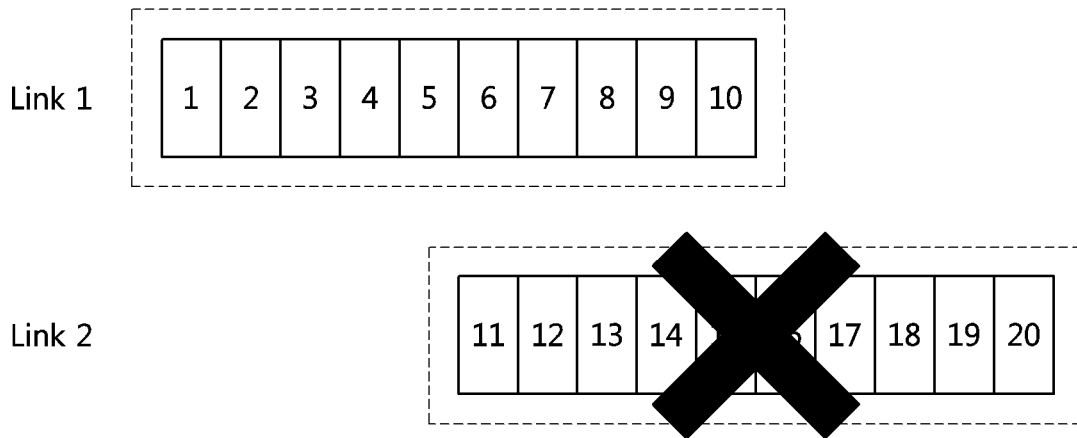
FIG. 10 is a conceptual diagram illustrating a problem in which an originator is not able to transmit a data frame using multiple links due to a limitation on a transmit window size of an originator in an independent MLA.

FIG. 10 is a conceptual diagram illustrating a problem in which an originator is not able to transmit a data frame using multiple links due to a limitation on a transmit window size of an originator in an independent MLA.

Referring to FIG. 10, in order to perform a block ack, an originator may set its own transmit window size in a block ACK agreement step. The originator may generate a QoS data block including MSDUs equal to the transmit window size.

In FIG. 10, since the transmit window size is set to 10, the originator may transmit 10 data frames through the link 1 in which a TXOP is configured. Thereafter, while the originator transmits 10 data frames, channel access to a link 2 may be successfully performed, and a TXOP may be configured.

In the conventional method of performing the block ack, even if the TXOP of the link 2 is configured, a block exceeding the transmit window size of the originator may not be generated. In this case, the originator may not be able to transmit a QoS data block through the link 2. Therefore, the originator may have to individually set the transmit window size for each link and manage it individually.

Figure 11:
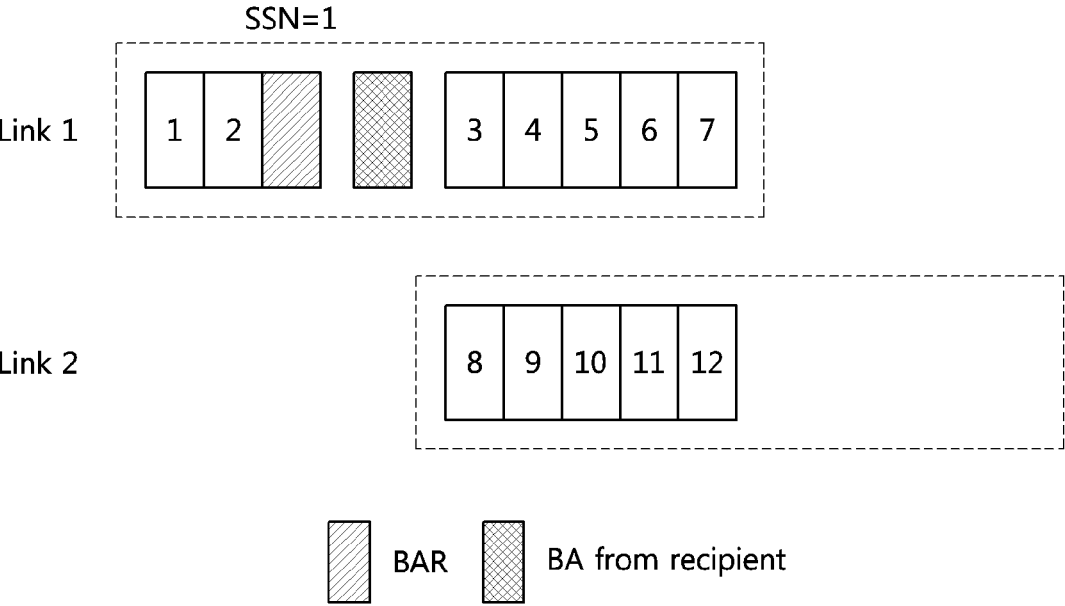
FIG. 11 is a conceptual diagram illustrating a method for an originator to manage a transmit window size for each link at a new TXOP time, when the originator is not able to transmit data frames by using multiple links due to a limitation on a transmit window size of the originator.

FIG. 11 is a conceptual diagram illustrating a method for an originator to manage a transmit window size for each link at a new TXOP time, when the originator is not able to transmit data frames by using multiple links due to a limitation on a transmit window size of the originator.

Referring to FIG. 11, when the transmit window size of the originator is set to 10 as shown in FIG. 10, the originator may transmit 10 data frames through the link 1 in which a TXOP is configured. Thereafter, while the originator transmits 10 data frames, channel access to the link 2 may be successfully performed, and a new TXOP may be configured.

Here, the originator may stop the transmission operation of the QoS data frames transmitted through the link 1 immediately before the channel access to the link 2 succeeds, and transmit a BAR. Then, the originator may receive a BA from the recipient. In addition, the originator may set the transmit window size for each link to 5 while exchanging the BAR and BA, and transmit a data frame block based on this. Here, the transmit window size for each link may be a value obtained by dividing the entire transmit window size by the number of links. Meanwhile, the transmit window size may be arbitrarily set in consideration of a communication environment.

Figure 12:
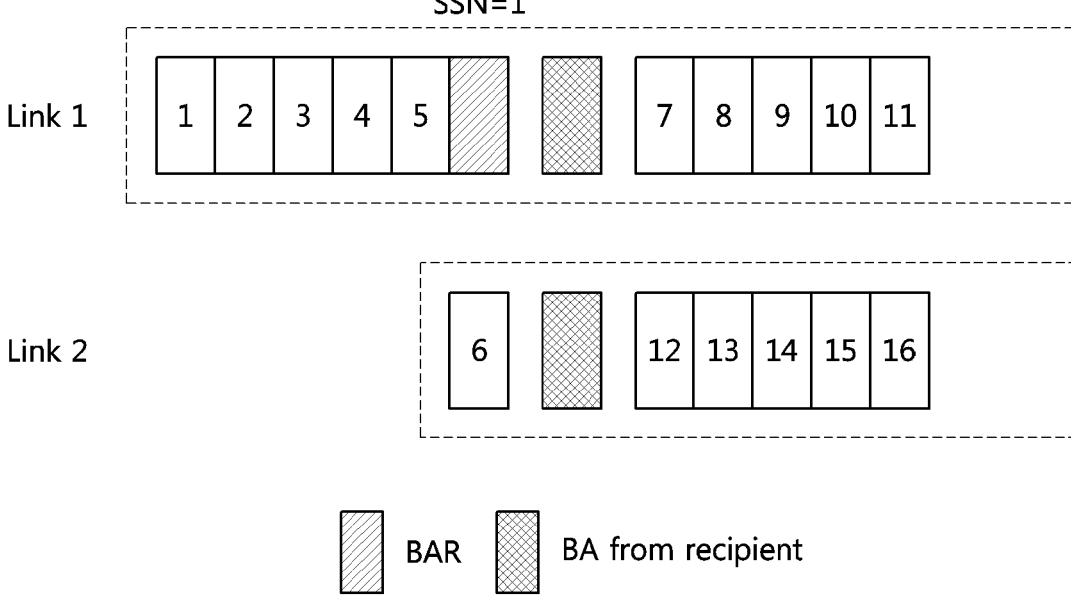
FIG. 12 is a conceptual diagram illustrating an exemplary embodiment in which an originator sets and manages a transmit window size for each link in a block ACK agreement step, when the originator is not able to transmit data frames by using multiple links due to a limitation on a transmit window size of the originator in case of an independent MLA.

FIG. 12 is a conceptual diagram illustrating an exemplary embodiment in which an originator sets and manages a transmit window size for each link in a block ACK agreement step, when the originator is not able to transmit data frames by using multiple links due to a limitation on a transmit window size of the originator in case of an independent MLA.

Referring to FIG. 12, an originator may set a transmit window size for each link in a block ACK agreement step for using multiple links. For example, the transmit window size may be set to 10 by communications between the originator and the recipient in the block ACK agreement step. Since the originator knows the total number of multiple links (e.g., the number of links in FIG. 12 is 2), the transmit window size for each link may be set to 5 (i.e., 10/2).

The transmit window size for each link may be a value obtained by dividing the entire transmit window size by the number of links. Meanwhile, the transmit window size may be arbitrarily set in consideration of a communication environment.

Meanwhile, the originator may first set a transmit window size for the link 1 in which a TXOP is configured. The originator may transmit a block of 5 QoS data frames based on the set transmit window size. Thereafter, the originator and the recipient may exchange a BAR and a BA. The originator may transmit a QoS data frame (e.g., data frame 6) having a next SN in a TXOP of the link 2 connected later until an end of the data block of the link 1. Thereafter, the originator may transmit a data block in sync with the data block of the link 1. The sixth QoS data frame with the next SN transmitted to synchronize the links may be replaced with a dummy data frame according to a communication environment.

Figure 13:
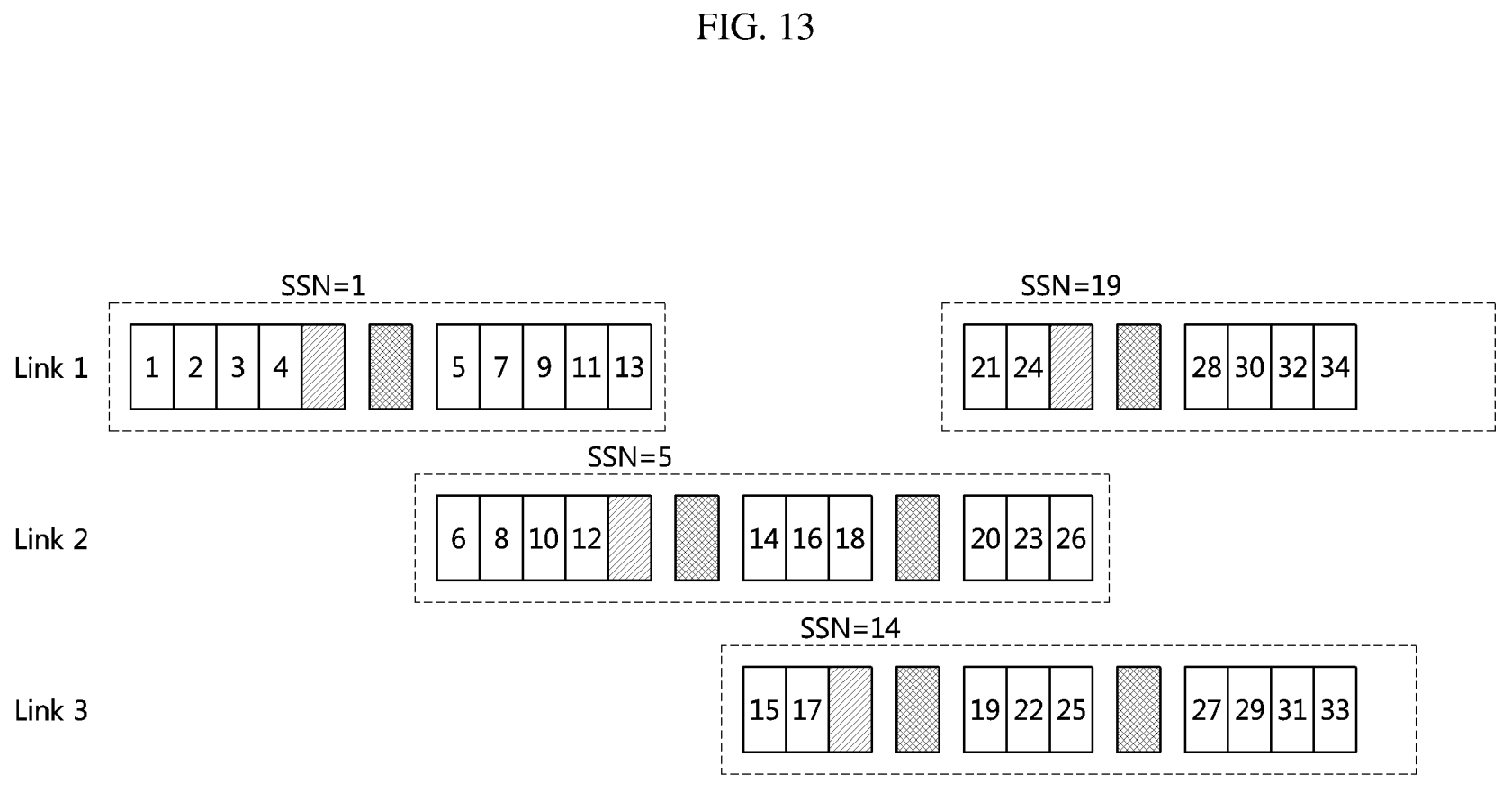

FIG. 13 is a conceptual diagram illustrating a multi-link transmission method performed in an independent MLA having three links.

Referring to FIG. 13, in an independent MLA environment in which the total number of links is three, a multi-link transmission operation may be performed. The originator may adjust a transmit window size for each link and transmit a BAR at a time when an existing TXOP ends, in order to apply an independent MLA to a communication node that does not support the full-duplex scheme.

When the originator does not adjust the transmit window size for each link, the originator may not perform the operation of transmitting a BAR and receiving a BA just before a new TXOP starts. The link through which the BAR is transmitted may be determined according to the communication environment, but a SSN of this BAR may be set to the smallest SN value of a block for which an ACK has not been received.

Regarding the multi-link operation, since parts that can be transmitted simultaneously, that is, the parts where the TXOPs are overlapped, are in form of the simultaneous MLA, the originator may transmit data frames by alternately setting SNs of the respective links for easy management of a memory of the reordering buffer of the recipient.

Figure 14:
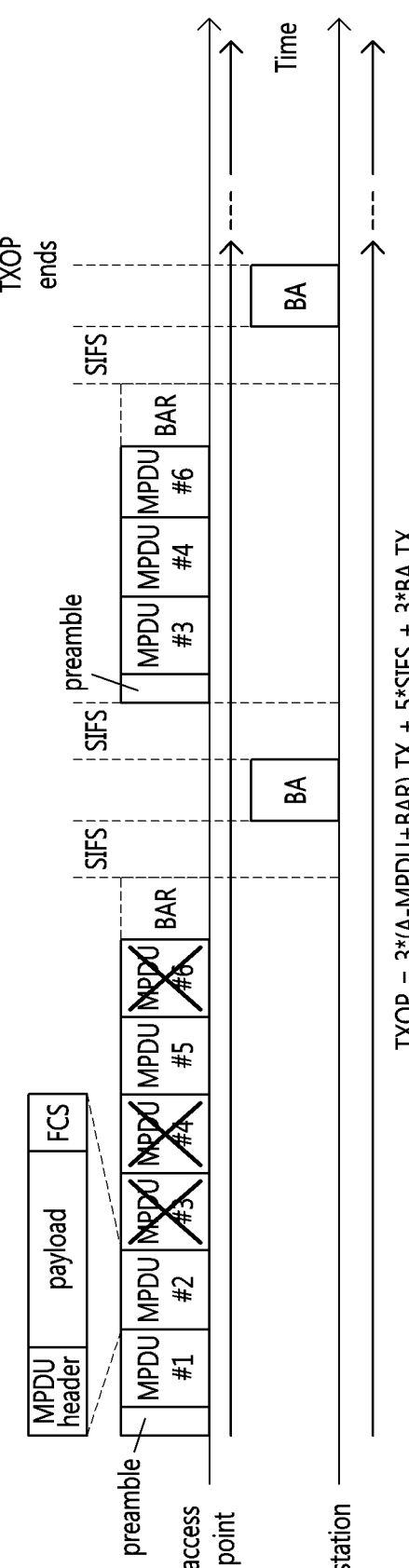
FIG. 14 is a conceptual diagram illustrating a method of transmitting a block ACK by a communication node.

FIG. 14 is a conceptual diagram illustrating a method of transmitting a block ACK by a communication node.

Referring to FIG. 14, when an error occurs due to an aggregated MAC protocol data unit (A-MPDU) being transmitted, retransmission is performed a predetermined number of times to recover a MPDU in which an error has occurred. Here, a hybrid automatic repeat request (HARQ) method that uses channel coding such as a low density parity check (LDPC), a convolution code, or a turbo code and retransmission together may be used.

Since feedback should be performed immediately after HARQ transmission, the originator may omit transmission of a BAR frame requesting a block ACK. In addition, the originator may transmit a BA immediately after a lapse of a SIFS after data is received. When the maximum number of transmissions including retransmission is 3, the originator may set a transmission time in a MAC header and a preamble during the initial transmission process to (3×A-MPDU transmission time+5×SIFS time+3×BA). The TXOP may be set to the above time.

The originator may transmit an initial packet, and the recipient may receive the packet transmitted from the originator. The recipient may transmit a reception status through the BA. The originator may configure a new A-MPDU with MPDUs known to have errors by the BA. The originator may receive the BA and transmit the new A-MPDU after a SIFS time.

On the other hand, when the HARQ is not used, the originator may configure the A-MPDU using the same MPDUs as previously transmitted. In contrast, when the HARQ is used, the originator may configure the A-MPDU by generating forward error correction (FEC) blocks configured differently according to a channel coding scheme for MPDUs or coding blocks indicated as NACK, in which errors are indicated by the BA as being occurred. In the case of using the HARQ, an MPDU may be configured by matching an MPDU unit with the coding block size.

The transmission time required for retransmission may be set by correcting the transmission time of the changed A-MPDU. This retransmission operation may be performed a predetermined number of times. On the other hand, if there is no error, the transmission time indicated by the duration field included in the MAC header of the last BA transmitted by the recipient may be set as the transmission time of the BA. Accordingly, the time corrected in the previous transmission may be terminated early in accordance with the transmission time of the BA. When there is no error in the initial transmission, the TXOP may be terminated early by the BA transmission. The transmission time set for each MPDU transmission may be calculated as follows.

$$T1 = 3 \times \text{first } A\text{-MPDU transmission time} + 5 \times \text{SIFS time} + 3 \times BA \text{ transmission time}$$

$$T2 = 2 \times \text{current retransmission } A\text{-MPDU transmission time} + 3 \times \text{SIFS time} + 2 \times BA \text{ transmission time}$$

$$T3 = \text{current retransmission } A\text{-MPDU transmission time} + 1 \times \text{SIFS time} + 1 \times BA \text{ transmission time}$$

Figure 15:
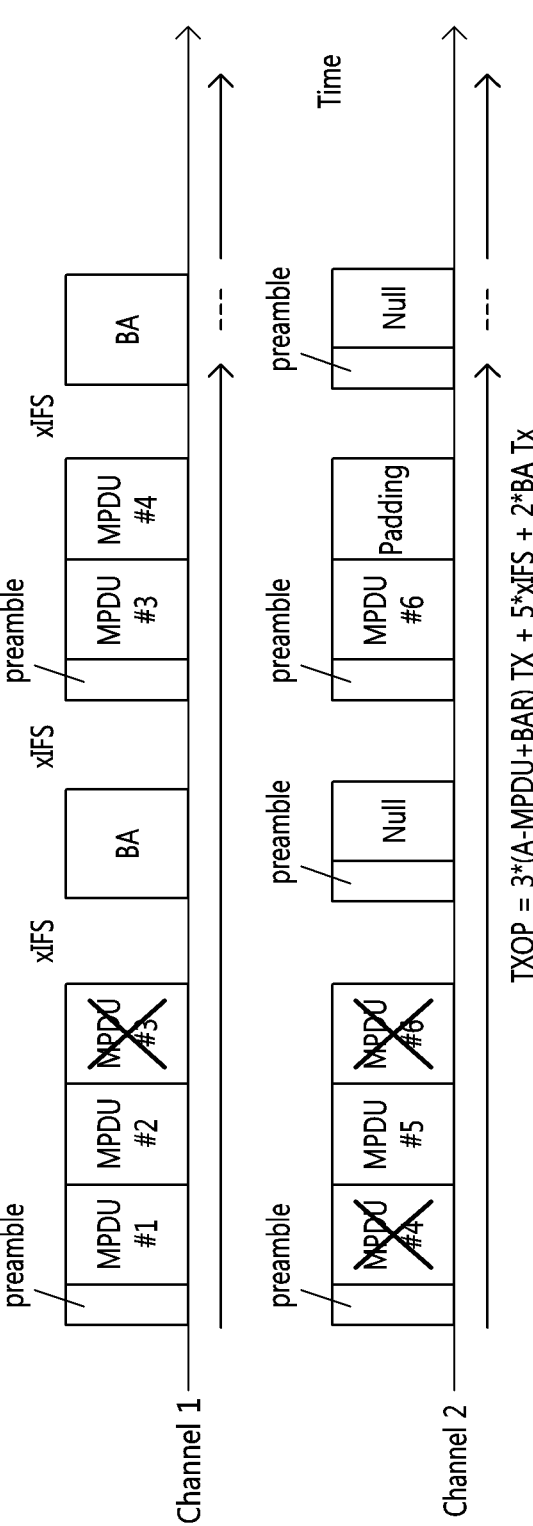
FIG. 15 is a conceptual diagram illustrating a method of transmitting a block ACK by a communication node in multiple links.

FIG. 15 is a conceptual diagram illustrating a method of transmitting a block ACK by a communication node in multiple links.

Referring to FIG. 15, an originator may transmit an A-MPDU in parallel through multiple links. The BA may be transmitted through a primary link. On a link other than the primary link, a null packet may be transmitted or the same BA may be transmitted during the same period. Therefore, it is possible to prevent other communication nodes from accessing.

Meanwhile, in the multi-link transmission, the transmission periods may have to be the same. For example, states in which an error occurs in an MPDU between links may be different, and therefore, there may not be an MPDU to perform retransmission on any one link. In this case, the originator may transmit padding data so that the transmission time is the same. The entire transmission period may be set according to the size of the retransmission A-MPDU. The originator may transmit the last BA by setting the transmission time of the current BA in the last BA, and may terminate the TXOP early.

Figure 16:
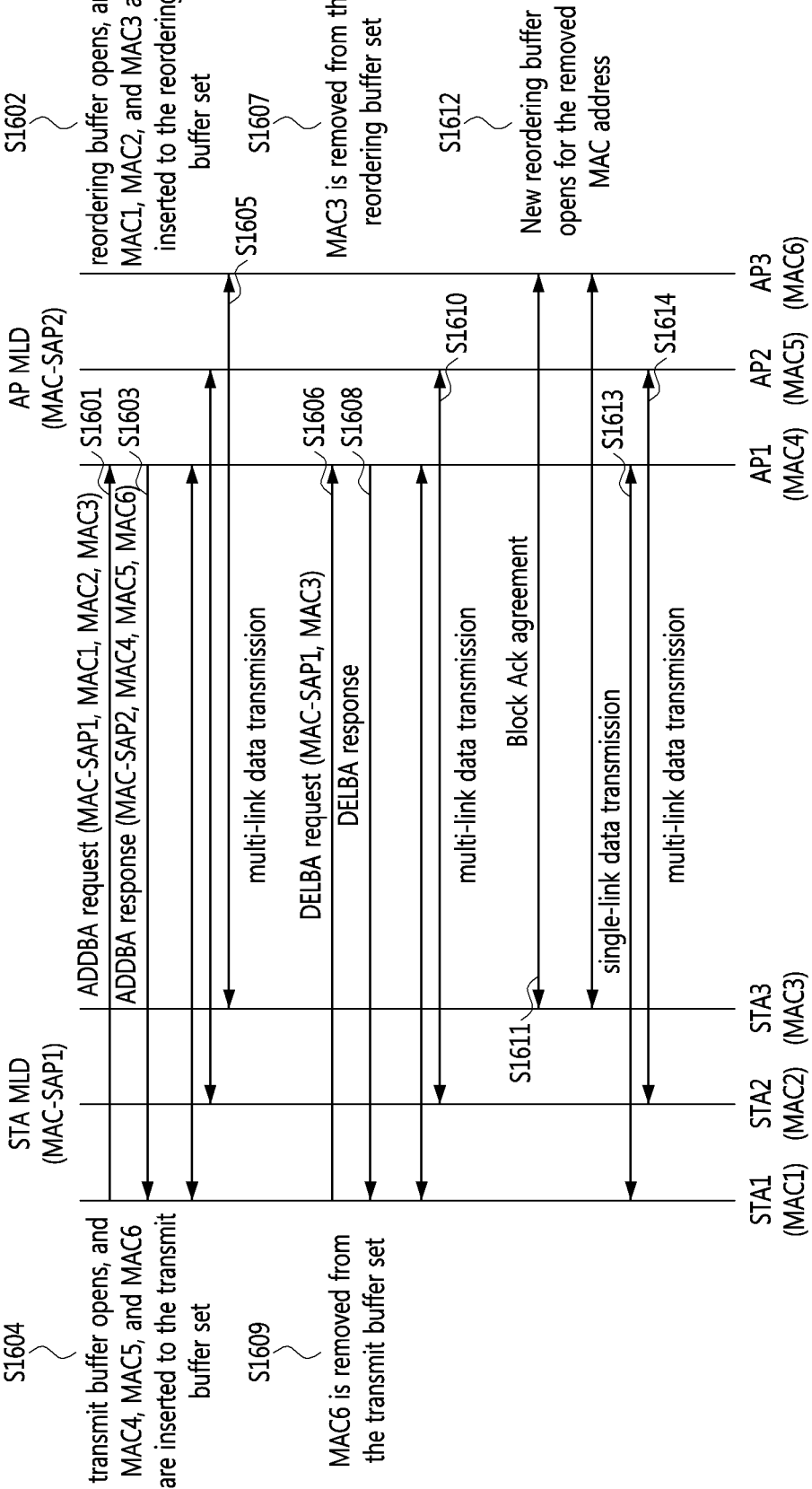
FIG. 16 is a sequence chart illustrating a method of managing a transmit buffer and a reordering buffer when a communication node performs a block ACK on multiple links.

FIG. 16 is a sequence chart illustrating a method of managing a transmit buffer and a reordering buffer when a communication node performs a block ACK on multiple links.

Referring to FIG. 16, a block ACK may be performed in an uplink environment in which a STA multi-link device (MLD) is an originator and an AP MLD is a recipient.

The STA MLD may have a MAC-service access point 1 (MAC-SAP1) address representing the MLD, and may have a MAC address (e.g., MAC1, MAC2, or MAC3) indicating STA1, STA2, or STA3 under the corresponding MAC-SAP1 address. The MAC-SAP1 may be separately designated or may have the same value as one of MAC1, MAC2, and MAC3. The AP MLD may also have a MAC-SAP2 address representing the MLD, and may have a MAC address (e.g., MAC4, MAC5, or MAC6) indicating AP1, AP2, or AP3 under the corresponding MAC-SAP2 address. The MAC-SAP2 may be separately designated or may have the same value as one of MAC4, MAC5, and MAC6. Before the block ACK transmission is performed, a block ACK agreement may be performed between the STA MLD that is an originator and the AP MLD that is a recipient.

The STA MLD may transmit an Add Block ACK (ADDBA) request signal to the AP MLD (S1601). In addition to existing parameters, the ADDBA request signal may include the new MAC-SAP1, MAC1, MAC2, and MAC3. Here, since the MAC1 of the STA1 transmitting the block ACK agreement is included in an existing TA field, the MAC1 may not be included in the ADDBA request signal.

The AP MLD may receive the ADDBA request signal from the STA MLD (S1601). The AP MLD may generate a new reordering buffer named as a <MAC-SAP1/TID> tuple (S1602). In addition, the AP MLD may record the MAC1, MAC2, and MAC3 in the reordering buffer set (S1602). Thereafter, QoS data frames whose TAs are the MAC1, MAC2, or MAC3 may be stored in the reordering buffer named as the <MAC-SAP1/TID> tuple.

The AP MLD may transmit an ADDBA response signal to the STA MLD (S1603). In addition to existing parameters, the ADDBA response signal may include the new MAC-SAP2, MAC4, MAC5, and MAC6. Here, since the MAC4 of the AP1 transmitting the block ACK agreement is included in an existing TA field, the MAC4 may not be included in the ADDBA response signal.

The STA MLD may receive the ADDBA response signal from the AP MLD (S1603). The STA MLD may generate a new transmit buffer named as a <MAC-SAP2/TID> tuple (S1604). In addition, the STA MLD may record the MAC4, MAC5, and MAC6 in the transmit buffer set (S1604). Thereafter, the transmit buffer named as the <MAC-SAP2/TID> tuple may be updated using a block ACK whose TA is the MAC4, MAC5, or MAC6. Thereafter, the STA MLD and the AP MLD may transmit and receive data using a multi-link method (S1605).

The STA1 may transmit a Delete Block ACK (DELBA) request signal to the AP MLD (S1606). The DELBA request signal may include the new MAC-SAP1 and MAC3 in addition to existing parameters. The AP MLD may receive the DELBA request signal from the STA1 (S1606). The AP MLD may remove the MAC3 from the existing reordering buffer set named as the <MAC-SAP1/TID> tuple (S1607). Accordingly, QoS data frames whose TAs are the MAC3 may not be stored in the existing reordering buffer named as the <MAC-SAP1/TID> tuple. In this manner, the AP MLD may remove the existing MAC address from the existing reordering buffer set based on the DELBA signal.

The AP MLD may transmit a DELBA response signal to the STA MLD (S1608). The STA MLD may receive the response signal from the AP MLD (S1608). The STA MLD may remove the MAC6 from the existing transmit buffer set named as the <MAC-SAP2/TID> tuple (S1609). Accordingly, QoS data frames whose TAs are the MAC6 may not be stored in the existing transmit buffer named as the <MAC-SAP2/TID> tuple. Thereafter, the STA MLD and the AP MLD may transmit and receive data using a multi-link method (S1610). Meanwhile, the AP MLD may generate a new reordering buffer for the removed MAC address (S1612) through a step S1611 of concluding a new block ACK agreement. Thereafter, the STA MLD and the AP MLD may transmit and receive data using a single-link method or a multi-link method (S1613, S1614).

Figure 17:
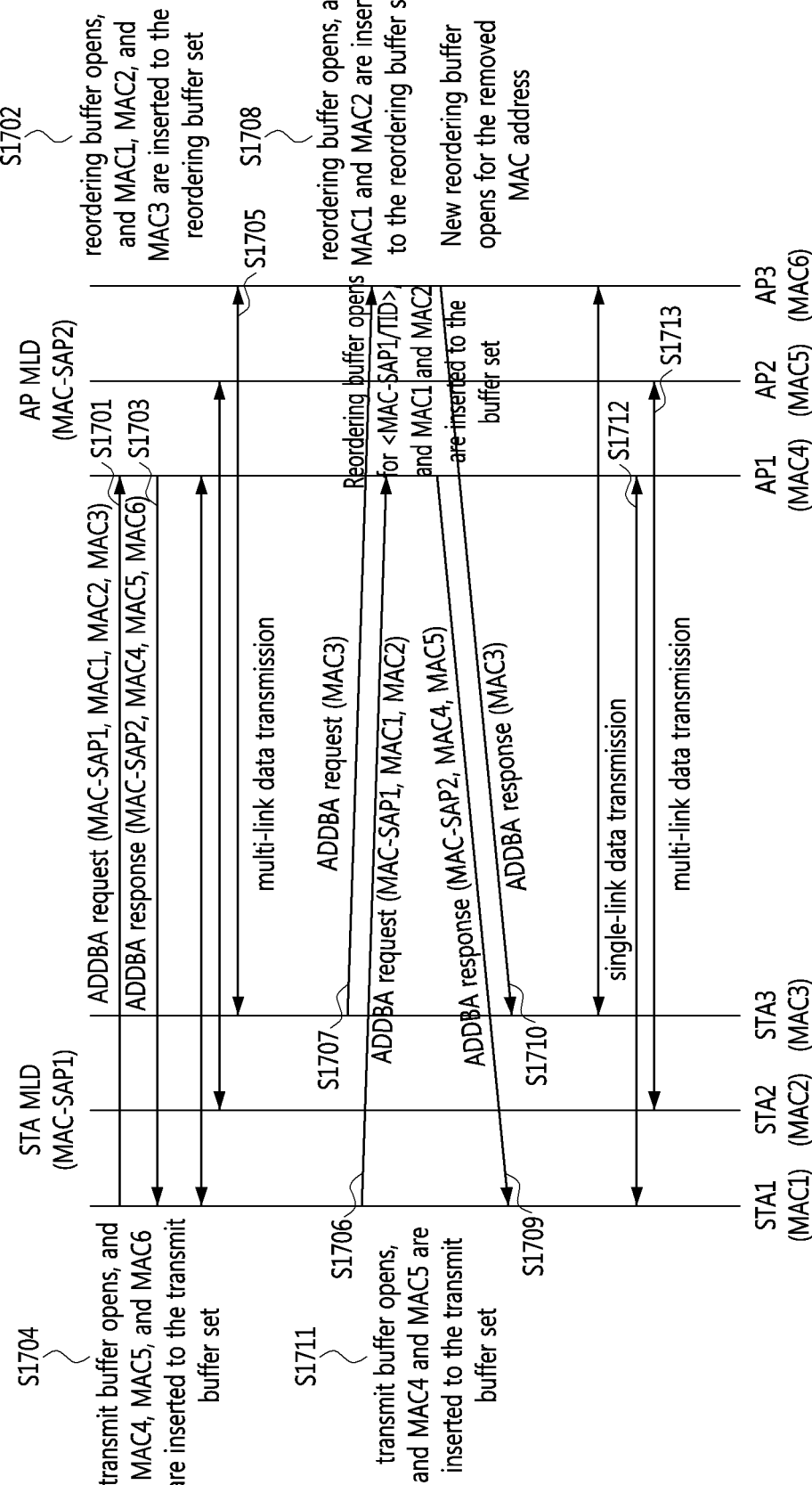
FIG. 17 is a sequence chart illustrating a method of efficiently concluding a new block ACK agreement in methods of managing a transmit buffer and a reordering buffer when performing a block ACK on multiple links.

Meanwhile, the above method may be applied equally to a downlink environment in which the AP MLD is an originator and the STA MLD is a recipient. FIG. 17 is a sequence chart illustrating a method of efficiently concluding a new block ACK agreement in methods of managing a transmit buffer and a reordering buffer when performing a block ACK on multiple links.

Referring to FIG. 17, a block ACK may be performed in an uplink environment in which a STA MLD is an originator and an AP MLD is a recipient. The STA MLD may have a MAC-SAP1 address representing the MLD, and may have a MAC address (e.g., MAC1, MAC2, or MAC3) indicating STA1, STA2, or STA3 under the corresponding MAC-SAP1 address. The MAC-SAP1 may be separately designated or may have the same value as one of MAC1, MAC2, and MAC3. The AP MLD may also have a MAC-SAP2 address representing the MLD, and may have a MAC address (e.g., MAC4, MAC5, or MAC6) indicating AP1, AP2, or AP3 under the corresponding MAC-SAP2 address. The MAC-SAP2 may be separately designated or may have the same value as one of MAC4, MAC5, and MAC6. Before the block ACK transmission is performed, a block ACK agreement may be performed between the STA MLD that is an originator and the AP MLD that is a recipient. The STA MLD may transmit an ADDBA request signal to the AP MLD (S1701). In addition to existing parameters, the ADDBA request signal may include the new MAC-SAP1, MAC1, MAC2, and MAC3. Here, since the MAC1 of the STA1 transmitting the block ACK agreement is included in an existing TA field, the MAC1 may not be included in the ADDBA request signal.

The AP MLD may receive the ADDBA request signal from the STA MLD (S1701). The AP MLD may generate a new reordering buffer named as a <MAC-SAP1/TID> tuple (S1702). In addition, the AP MLD may record the MAC1, MAC2, and MAC3 in the reordering buffer set (S1702). Thereafter, QoS data frames whose TAs are the MAC1, MAC2, or MAC3 may be stored in the reordering buffer named as the <MAC-SAP1/TID> tuple.

The AP MLD may transmit an ADDBA response signal to the STA MLD (S1703). In addition to existing parameters, the ADDBA response signal may include the new MAC-SAP2, MAC4, MAC5, and MAC6. Here, since the MAC4 of the AP1 transmitting the block ACK agreement is included in an existing TA field, the MAC4 may not be included in the ADDBA response signal.

The STA MLD may receive the ADDBA response signal from the AP MLD (S1703). The STA MLD may generate a new transmit buffer named as a <MAC-SAP2/TID> tuple (S1704). In addition, the STA MLD may record the MAC4, MAC5, and MAC6 in the transmit buffer set (S1704). Thereafter, the transmit buffer named as the <MAC-SAP2/TID> tuple may be updated using a block ACK whose TA is the MAC4, MAC5, or MAC6. Thereafter, the STA MLD and the AP MLD may transmit and receive data using a multi-link method (S1705).

The STA1 may transmit an ADDBA request signal including the MAC-SAP1, MAC1, and MAC2 to the AP MLD, and at the same time, the STA3 may also transmit an ADDBA request signal to the AP MLD (S1706, S1707). The two ADDBA request signals may have aligned physical layer protocol data units (PPDUs) in order to increase the efficiency of signal transmission.

The AP MLD may receive the two ADDBA request signals (S1706, S1707). The AP MLD may record the MAC1 and MAC2 in the reordering buffer set named as the <MAC-SAP2/TID> tuple. In other words, the AP MLD may remove the MAC3 from the existing reordering buffer set named as the <MAC-SAP1/TID> tuple, and generate a new reordering buffer set named as a <MAC3/TID> tuple (S1708). In addition, it may be determined whether to maintain or delete the stored MSDUs from the existing reordering buffer named as the <MAC-SAP1/TID> tuple, by referring to a SSN field of the ADDBA request signal transmitted by the STA1. For example, the reordering buffer may perform an existing SSN operation scheme such as deleting MSDUs stored in the buffer when a newly transmitted SSN value is greater than values of the stored MSDUs. Thereafter, the AP MLD may transmit ADDBA response signals to the STA1 and STA3 (S1709, S1710). The STA1 and STA3 may respectively receive the ADDBA response signal from the AP MLD (S1709, S1710). The STA MLD may record the MAC4 and MAC6 in the existing transmit buffer set named as the <MAC-SAP2/TID> tuple (S1711). Thereafter, the STA MLD and the AP MLD may transmit and receive data using a single-link method or a multi-link method (S1712, S1713).

Meanwhile, the above method may be applied equally to a downlink environment in which the AP MLD is an originator and the STA MLD is a recipient.

Figure 18:
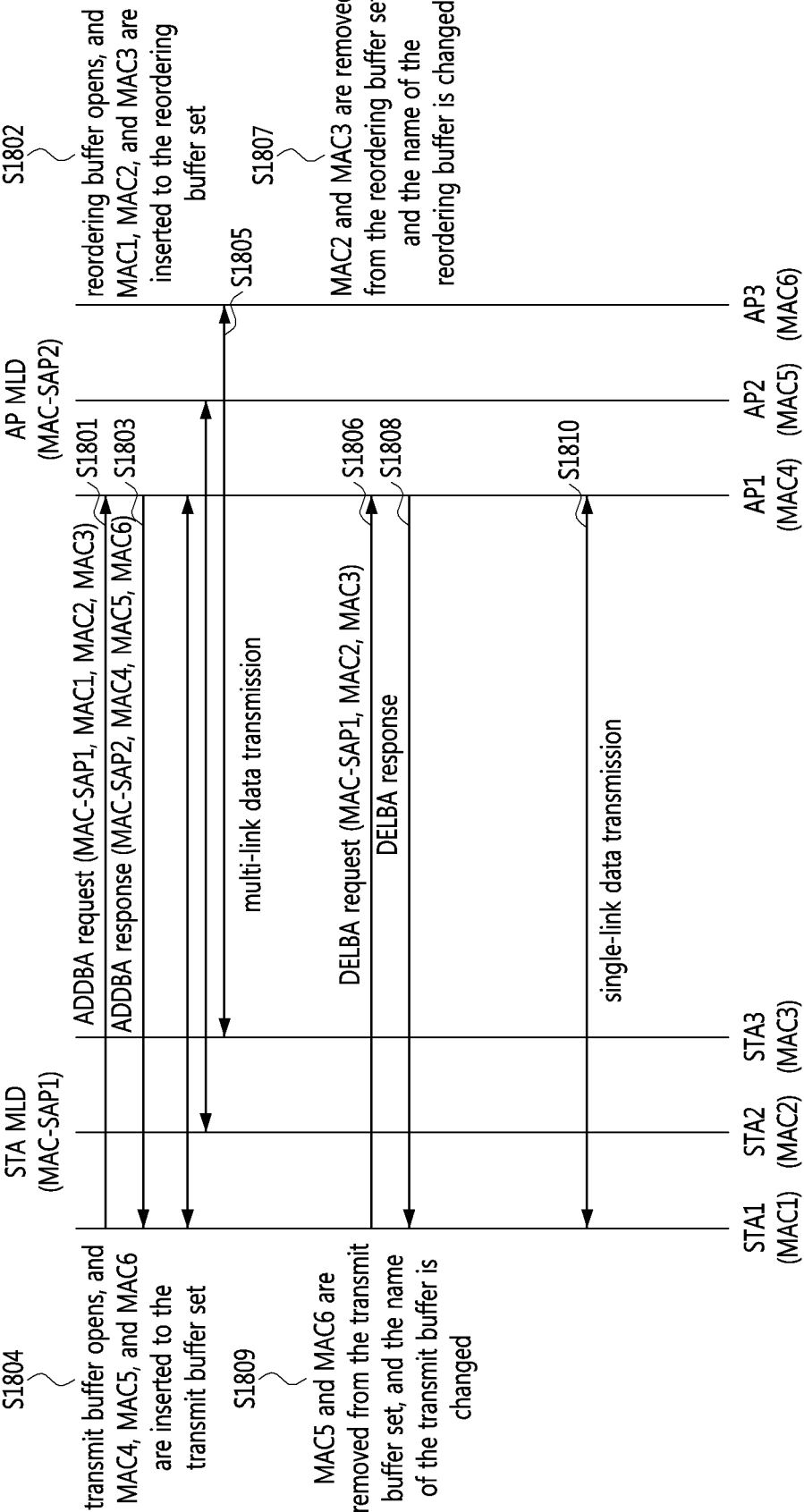
FIG. 18 is a sequence chart illustrating a method of switching to a single link transmission scheme in methods of managing a transmit buffer and a reordering buffer when performing a block ACK on multiple links.

FIG. 18 is a sequence chart illustrating a method of switching to a single link transmission scheme in methods of managing a transmit buffer and a reordering buffer when performing a block ACK on multiple links.

Referring to FIG. 18, a block ACK may be performed in an uplink environment in which a STA MLD is an originator and an AP MLD is a recipient.

The STA MLD may have a MAC-service access point 1 (MAC-SAP1) address representing the MLD, and may have a MAC address (e.g., MAC1, MAC2, or MAC3) indicating STA1, STA2, or STA3 under the corresponding MAC-SAP1 address. The MAC-SAP1 may be separately designated or may have the same value as one of MAC1, MAC2, and MAC3. The AP MLD may also have a MAC-SAP2 address representing the MLD, and may have a MAC address (e.g., MAC4, MAC5, or MAC6) indicating AP1, AP2, or AP3 under the corresponding MAC-SAP2 address. The MAC-SAP2 may be separately designated or may have the same value as one of MAC4, MAC5, and MAC6. Before the block ACK transmission is performed, a block ACK agreement may be performed between the STA MLD that is an originator and the AP MLD that is a recipient.

The STA MLD may transmit an ADDBA request signal to the AP MLD (S1801). In addition to existing parameters, the ADDBA request signal may include the new MAC-SAP1, MAC1, MAC2, and MAC3. Here, since the MAC1 of the STA1 transmitting the block ACK agreement is included in an existing TA field, the MAC1 may not be included in the ADDBA request signal.

The AP MLD may receive the ADDBA request signal from the STA MLD (S1801). The AP MLD may generate a new reordering buffer named as a <MAC-SAP1/TID> tuple (S1802). In addition, the AP MLD may record the MAC1, MAC2, and MAC3 in the reordering buffer set (S1802). Thereafter, QoS data frames whose TAs are the MAC1, MAC2, or MAC3 may be stored in the reordering buffer named as the <MAC-SAP1/TID> tuple.

The AP MLD may transmit an ADDBA response signal to the STA MLD (S1803). In addition to existing parameters, the ADDBA response signal may include the new MAC-SAP2, MAC4, MAC5, and MAC6. Here, since the MAC4 of the STA4 transmitting the block ACK agreement is included in an existing TA field, the MAC4 may not be included in the ADDBA response signal.

The STA MLD may receive the ADDBA response signal from the AP MLD (S1803). The STA MLD may generate a new transmit buffer named as a <MAC-SAP2/TID> tuple (S1804). In addition, the STA MLD may record the MAC4, MAC5, and MAC6 in the transmit buffer set (S1804). Thereafter, the transmit buffer named as the <MAC-SAP2/TID> tuple may be updated using a block ACK whose TA is the MAC4, MAC5, or MAC6. Thereafter, the STA MLD and the AP MLD may transmit and receive data using a multi-link method (S1805).

The STA1 may transmit a DELBA request signal including the MAC-SAP1, MAC2, and MAC3 (S1806). The AP MLD may receive the DELBA request signal (S1806). The AP MLD may remove the MAC2 and MAC3 from the existing reordering buffer set named as the <MAC-SAP1/TID> tuple (S1807).

The AP MLD may confirm that only the MAC1 is included in the reordering buffer set named as the <MAC-SAP1/TID> tuple, and accordingly, the AP MLD may confirm that the data transmission scheme has been switched to the single link transmission scheme.

Thereafter, the AP MLD may change the name of the reordering buffer named as the existing <MAC-SAP1/TID> tuple from the <MAC-SAP1/TID> to a <MAC1/TID> (S1807). The AP MLD may transmit a DELBA response signal (S1808).

The STA MLD may receive the DELBA response signal from the AP MLD (S1808). In addition, the STA MLD may identify that the transmission scheme has been switched to the single link transmission scheme. The STA MLD may remove the MAC5 and MAC6 from the existing transmit buffer set named as the <MAC-SAP2/TID> tuple. In addition, the STA MLD may change the name of the existing transmit buffer named as the <MAC-SAP2/TID> tuple from the <MAC-SAP2/TID> to a <MAC4/TID> (S1809). Thereafter, the STA MLD and the AP MLD may transmit and receive data using a single-link method (S1810).

Meanwhile, the above method may be applied equally to a downlink environment in which the AP MLD is an originator and the STA MLD is a recipient.

Figure 19:
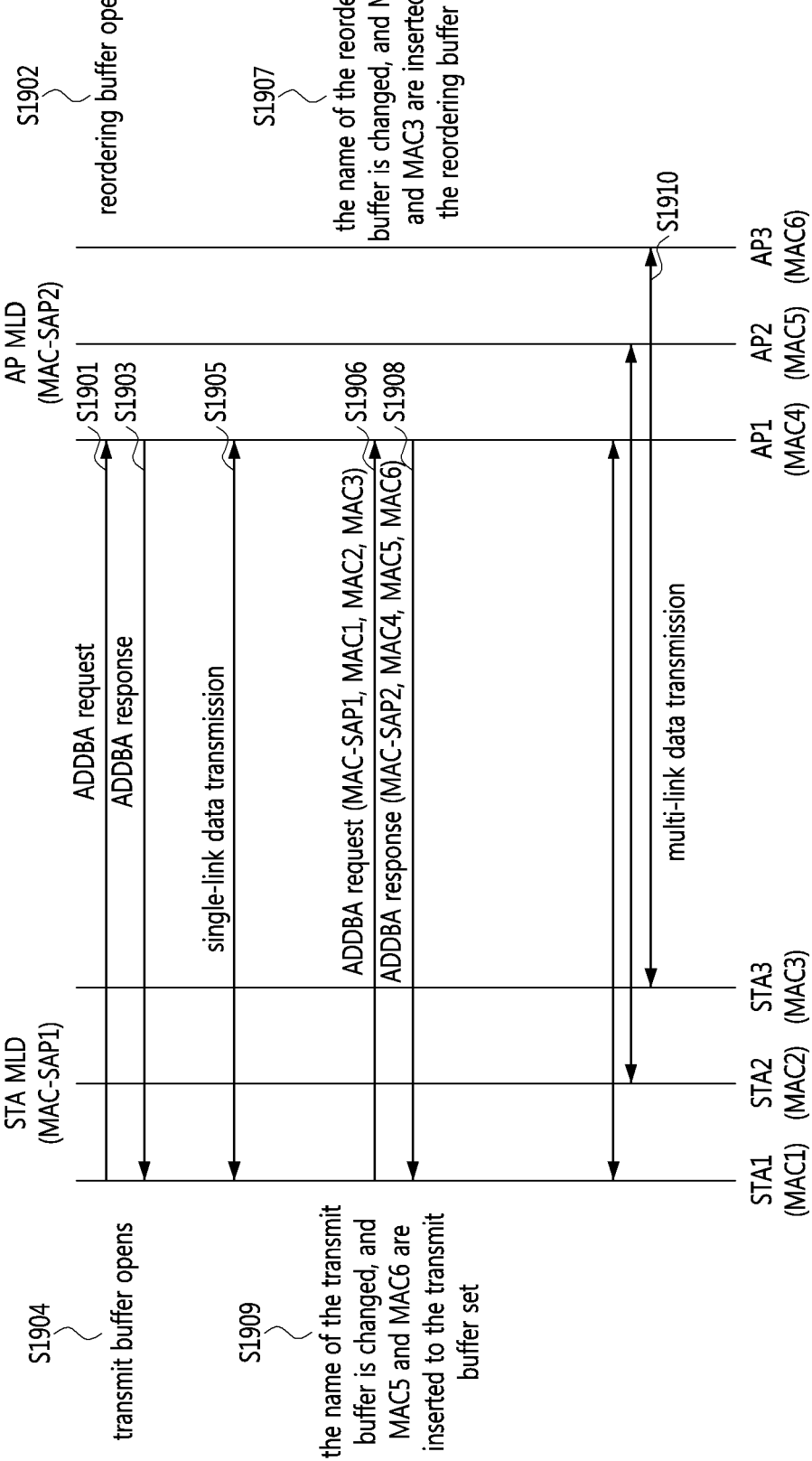
FIG. 19 is a sequence chart illustrating a method of switching to a multi-link transmission scheme in methods of managing a transmit buffer and a reordering buffer when performing a block ACK on multiple links.

FIG. 19 is a sequence chart illustrating a method of switching to a multi-link transmission scheme in methods of managing a transmit buffer and a reordering buffer when performing a block ACK on multiple links.

Referring to FIG. 19, a block ACK may be performed in an uplink environment in which a STA MLD is an originator and an AP MLD is a recipient. The STA MLD may have a MAC-service access point 1 (MAC-SAP1) address representing the MLD, and may have a MAC address (e.g., MAC1, MAC2, or MAC3) indicating STA1, STA2, or STA3 under the corresponding MAC-SAP1 address. The MAC-SAP1 may be separately designated or may have the same value as one of MAC1, MAC2, and MAC3. The AP MLD may also have a MAC-SAP2 address representing the MLD, and may have a MAC address (e.g., MAC4, MAC5, or MAC6) indicating AP1, AP2, or AP3 under the corresponding MAC-SAP2 address. The MAC-SAP2 may be separately designated or may have the same value as one of MAC4, MAC5, and MAC6. Before the block ACK transmission is performed, a block ACK agreement may be performed between the STA MLD that is an originator and the AP MLD that is a recipient.

The STA MLD may transmit an ADDBA request signal to the AP MLD (S1901). The AP MLD may receive the ADDBA request signal from the STA MLD (S1901). The AP MLD may generate a reordering buffer named as a <MAC1/TID> tuple (S1902).

The AP MLD may transmit an ADDBA response signal to the STA MLD (S1903). The STA MLD may receive the ADDBA response signal from the AP MLD (S1903). The STA MLD may generate a transmit buffer named as a <MAC4/TID> tuple (S1904).

The STA MLD and the AP MLD may transmit and receive data using a single link transmission method (S1905). Thereafter, the STA MLD may transmit a new ADDBA request signal (S1906). In addition to existing parameters, the new ADDBA request signal may include the new MAC-SAP1, MAC1, MAC2, and MAC3. Here, since the MAC1 of the STA1 transmitting the block ACK agreement is included in an existing TA field, the MAC1 may not be included in the ADDBA request signal.

The AP MLD may receive the ADDBA request signal from the STA MLD (S1906). The AP MLD may re-name the name of the existing reordering buffer named as the <MAC1/TID> tuple to a <MAC-SAP1/TID> (S1907). In addition, the AP MLD may record the MAC1, MAC2, and MAC3 in the reordering buffer set.

Thereafter, QoS data frames whose TAs are the MAC1, MAC2, or MAC3 may be stored in the reordering buffer named as the <MAC-SAP1/TID> tuple. In this case, it may be determined whether to maintain or delete MSDUs of the existing <MAC1/TID> in the reordering buffer named as the changed <MAC-SAP1/TID> tuple, by referring to a SSN field of the ADDBA request signal transmitted by the STA1. For example, the reordering buffer may follow an existing SSN operation method such as deleting MSDUs stored in the buffer when a newly transmitted SSN value is greater than the values of the stored MSDUs.

The AP MLD may transmit an ADDBA response signal to the STA MLD (S1908). In addition to existing parameters, the ADDBA response signal may include the new MAC-SAP2, MAC4, MAC5, and MAC6. Here, since the MAC4 of the STA4 transmitting a block ACK agreement is included in an existing TA field, the MAC4 may not be included in the ADDBA response signal.

The STA MLD may receive the ADDBA response signal from the AP MLD (S1908). The STA MLD may re-name the name of the existing transmit buffer named as the <MAC4/TID> tuple to a <MAC-SAP2/TID> (S1909). In addition, the STA MLD may record the MAC4, MAC5, and MAC6 in the transmit buffer set. Thereafter, the transmit buffer named as the <MAC-SAP2/TID> tuple may be updated by using a block ACK whose TA is the MAC4, MAC5, or MAC6. Thereafter, the STA MLD and the AP MLD may transmit and receive data using a multi-link method (S1910).

Meanwhile, the above method may be applied equally to a downlink environment in which the AP MLD is an originator and the STA MLD is a recipient.

Figure 20:
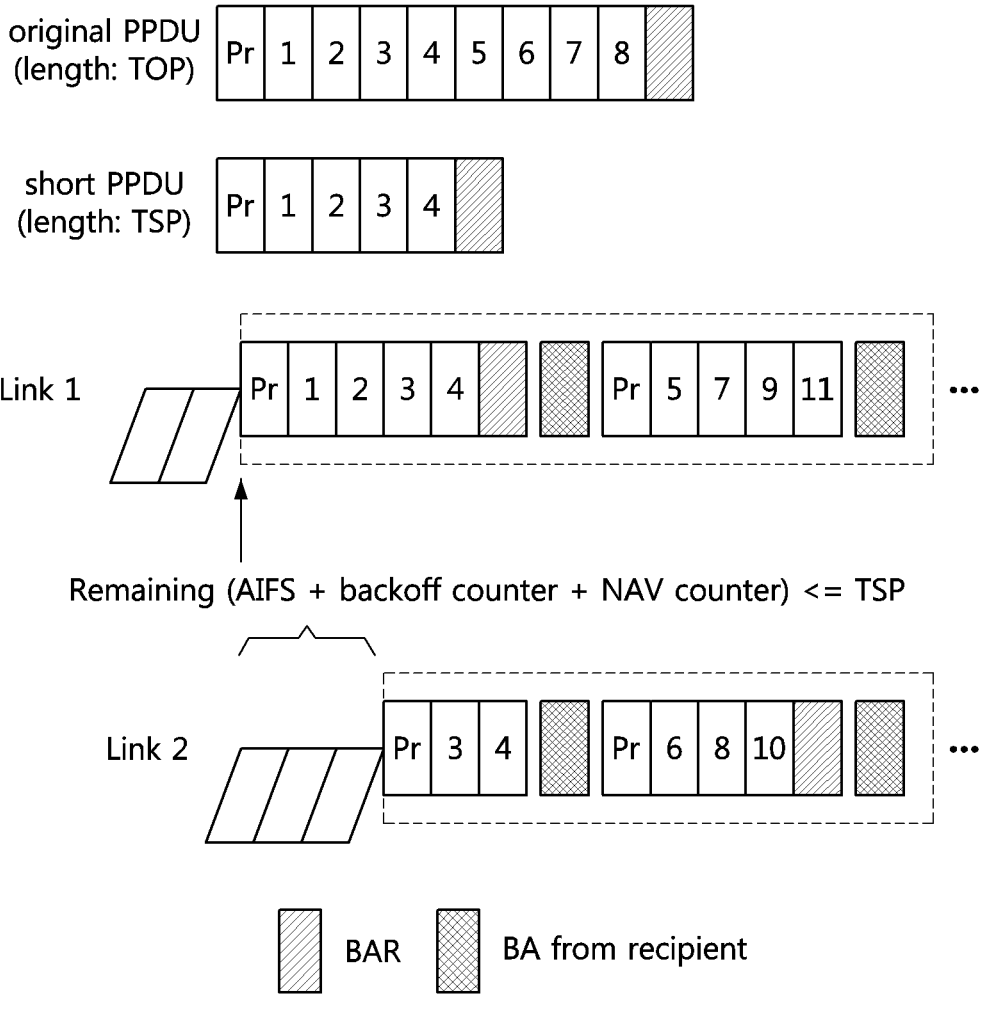
FIG. 20 is a conceptual diagram illustrating a method in which a communication node duplicates a QoS data frame and synchronizes when a remaining value is less than a time of short PPDU (TSP) value in a multi-link.

FIG. 20 is a conceptual diagram illustrating a method in which a communication node duplicates a QoS data frame and synchronizes when a remaining value is less than a time of short PPDU (TSP) value in a multi-link.

Referring to FIG. 20, in the independent transmission scheme, channel access may be performed on the link 1 and the link 2, respectively. The originator may desire to transmit an original PPDU generated in an EDCA queue on the link 1 before the channel access to the link 1 is successful.

The original PPDU may have a maximum length (TOP) of 5.484 ms (i.e., aPPDUMaxTime). In addition to the original PPDU, which has a transmission length of the time of original PPDU (TOP), the communication node may additionally generate a short PPDU having a length of a TSP shorter than the transmission length of the TOP. In addition, the communication node may prepare to transmit the short PPDU.

In this case, each of the original PPDU and the short PPDU may be a complete PPDU including a preamble, a QoS data frame and a BAR. Meanwhile, in case of an implicit BAR mode, the BAR may be omitted. When the BAR is omitted, an MPDU may be included in the PPDU instead of the BAR. The TSP and TOP may be a time required to physically transmit/receive a PPDU through an air interface.

When the channel access to the link 1 is successfully performed, the originator may identify a remaining value from a start point of the TXOP indicated by a dotted line until an expected success time of the channel access to the link 2. The remaining value to the expected success time of the channel access may vary according to a state of the link. When the link is in a busy state, the remaining value may be (a network allocation vector (NAV) counter+AIFS+backoff counter value) indicating a time at which the busy state ends. When backoff is being performed, the remaining backoff counter value may be the remaining value. Also in the following exemplary embodiments, the remaining value may mean the time remaining until the expected success time of the channel access, and may be predicted according to whether the channel state is busy as in the above case.

The remaining value may be a time required physically. Meanwhile, the above operation may not be performed in an environment in which the NAV counter cannot be identified, for example, an environment in which only energy detection (ED) sensing is possible.

When the remaining value is equal to or less than the TSP or a predetermined value, the originator may transmit the short PPDU not the original PPDU. In addition, when the channel access to the link 1 is successfully performed, at the same time, the originator may generate a PPDU having a length of (TSP–remaining value). The PPDU may be a PPD to be transmitted through the link 2. The PPDU may include duplicated MSDUs to be transmitted through the link 1 or MSDUs for which retransmission requests are received through a block ACK. The originator may align the lengths of the configured PPDUs by transmitting padding data at the PHY layer.

When the channel access to the link 2 is successfully performed, the originator may transmit the generated PPDU having the length of (TSP–remaining value) on the link 2. Thereafter, the recipient may duplicate a block ACK and transmit it on multiple links, and the originator may simultaneously transmit PPDUs on the multiple links by synchronizing at the next transmit opportunity. In this case, as shown in FIG. 6, when using multiple links, the originator may alternately arrange the sequence numbers, so that the delay of the buffer can be minimized.

Figure 21:
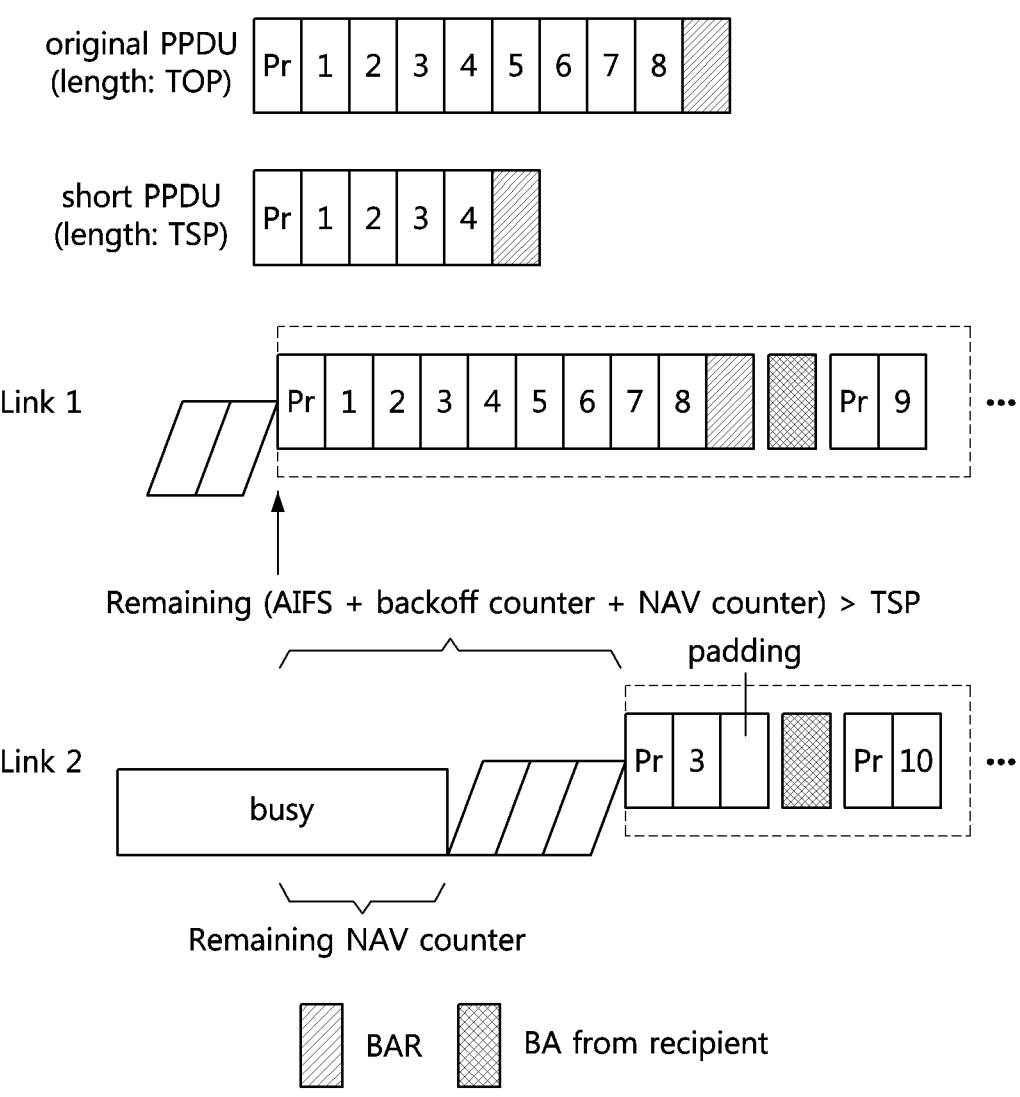
FIG. 21 is a conceptual diagram illustrating a method in which a communication node duplicates a QoS data frame and synchronizes when a remaining value is greater than a TSP in multiple links.

FIG. 21 is a conceptual diagram illustrating a method in which a communication node duplicates a QoS data frame and synchronizes when a remaining value is greater than a TSP in multiple links.

Referring to FIG. 21, in the independent transmission scheme, channel access may be performed on the link 1 and the link 2, respectively. The originator may desire to transmit an original PPDU generated in an EDCA queue on the link 1 before the channel access to the link 1 is successful.

The original PPDU may have a maximum length (TOP) of 5.484 ms (i.e., aPPDUMaxTime). In addition to the original PPDU, which has a transmission length of the time of original PPDU (TOP), the communication node may additionally generate a short PPDU having a length of a TSP shorter than the transmission length of the TOP. In addition, the communication node may prepare to transmit the short PPDU. In this case, each of the original PPDU and the short PPDU may be a complete PPDU including a preamble, a QoS data frame, and a BAR. Meanwhile, in case of an implicit BAR mode, the BAR may be omitted.

When the channel access to the link 1 is successfully performed, the originator may identify a remaining value of the link 2 from a start point of the TXOP indicated by a dotted line. Meanwhile, the above operation may not be performed in an environment in which the NAV counter cannot be identified, for example, an environment in which only energy detection (ED) sensing is possible.

In FIG. 21, when the channel access to the link 1 is successfully performed, a state of the link 2 may be a busy state. Therefore, the value of the NAV counter may not be 0. When the remaining value exceeds the TSP or a predetermined value, the originator may transmit the original PPDU. In addition, when the channel access to the link 1 is successfully performed, at the same time, the originator may generate a PPDU having a length of (TSP–remaining value). The PPDU may be a PPDU to be transmitted on the link 2. The PPDU may include duplicated MSDUs to be transmitted through the link 1 or MSDUs for which retransmission requests are received through a block ACK. The originator may align the lengths of the configured PPDUs by transmitting padding data at the PHY layer.

When the channel access to the link 2 is successfully performed, the originator may transmit the generated PPDU having the length of (TSP–remaining value) on the link 2. Thereafter, the recipient may duplicate a block ACK and transmit it on multiple links, and the originator may simultaneously transmit PPDUs on the multiple links by synchronizing at the next transmit opportunity. In this case, as shown in FIG. 6, when using multiple links, the originator may alternately arrange the sequence numbers, so that the delay of the buffer can be minimized.

Figure 22:
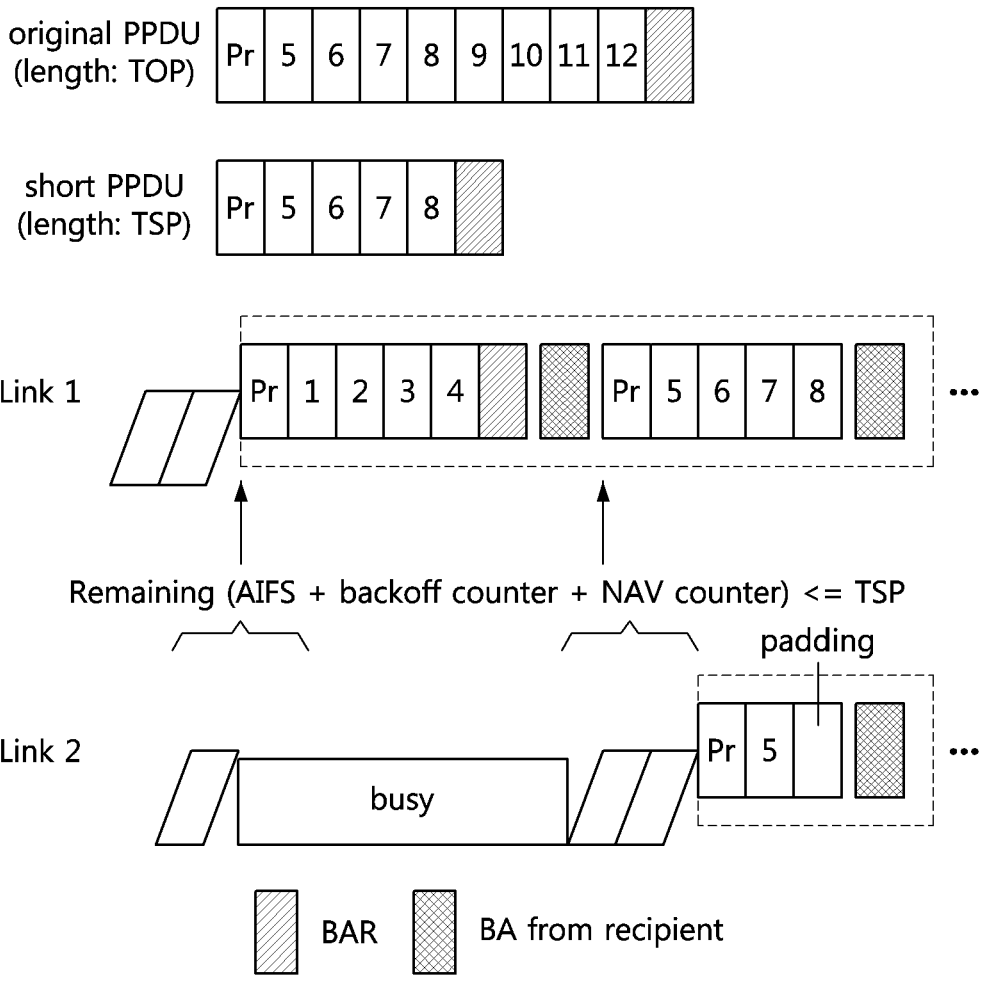
FIG. 22 is a conceptual diagram illustrating a synchronization method when a long busy period occurs on a link 2 after a communication node calculates a remaining value in case that a channel access to a link 1 is successfully performed.

FIG. 22 is a conceptual diagram illustrating a synchronization method when a long busy period occurs on a link 2 after a communication node calculates a remaining value in case that a channel access to a link 1 is successfully performed.

Referring to FIG. 22, in the independent transmission scheme, channel access may be performed on the link 1 and the link 2, respectively. The originator may desire to transmit an original PPDU generated in an EDCA queue on the link 1 before the channel access to the link 1 is successful.

The original PPDU may have a maximum length (TOP) of 5.484 ms (i.e., aPPDUMaxTime). In addition to the original PPDU, which has a transmission length of the time of original PPDU (TOP), the communication node may additionally generate a short PPDU having a length of a TSP shorter than the transmission length of the TOP. In addition, the communication node may prepare to transmit the short PPDU. In this case, each of the original PPDU and the short PPDU may be a complete PPDU including a preamble, a QoS data frame, and a BAR. Meanwhile, in case of an implicit BAR mode, the BAR may be omitted.

When the channel access to the link 1 is successfully performed, the originator may identify a remaining value of the link 2 from a start point of the TXOP indicated by a dotted line. Meanwhile, the above operation may not be performed in an environment in which the NAV counter cannot be identified, for example, an environment in which only energy detection (ED) sensing is possible.

When the remaining value is equal to or less than the TSP or a predetermined value, the originator may transmit the short PPDU not the original PPDU. In addition, when the channel access to the link 1 is successfully performed, at the same time, the originator may generate a PPDU having a length of (TSP–remaining value). The PPDU may be a PPDU to be transmitted on the link 2. The PPDU may include duplicated MSDUs to be transmitted through the link 1 or MSDUs for which retransmission requests are received through a block ACK. The originator may align the length of the configured PPDUs by transmitting padding data at the PHY layer.

However, before the channel access to the link 2 is successfully performed, the state of the link 2 may become a long busy state. Immediately after the busy state is detected, the originator may discard the previously generated PPDU to be transmitted on the link 2, and at the same time, the originator may generate original PPDUs (i.e., 5~12) and short PPDUs (i.e., 5~8) to be transmitted at the next transmit opportunity of the link 1. The series of exemplary embodiments described so far may be equally applied even when the remaining value exceeds a TSP or a predetermined value as shown in FIG. 21.

In addition, the originator may identify a remaining value of the link 2 again at a time when transmission of the next PPDU on the link 1 starts before the channel access to the link 2 is started. The above operation may not be performed in an environment in which the NAV counter cannot be identified, for example, an environment in which only energy detection (ED) sensing is possible. Thereafter, the method proposed in FIGS. 20 and 21 may be repeated.

FIG. 23 is a conceptual diagram illustrating a synchronization method when a short busy period occurs in a link 2 after a communication node calculates a remaining value in case that a channel access to a link 1 is successfully performed.

Referring to FIG. 23, in the independent transmission scheme, channel access may be performed on the link 1 and the link 2, respectively. The originator may desire to transmit an original PPDU generated in an EDCA queue on the link 1 before the channel access to the link 1 is successful.

The original PPDU may have a maximum length (TOP) of 5.484 ms (i.e., aPPDUMaxTime). In addition to the original PPDU, which has a transmission length of the time of original PPDU (TOP), the communication node may additionally generate a short PPDU having a length of a TSP shorter than the transmission length of the TOP. In addition, the communication node may prepare to transmit the short PPDU. In this case, each of the original PPDU and the short PPDU may be a complete PPDU including a preamble, a QoS data frame, and a BAR. Meanwhile, in case of an implicit BAR mode, the BAR may be omitted.

When the channel access to the link 1 is successfully performed, the originator may identify a remaining value of the link 2 from a start point of the TXOP indicated by a dotted line. Meanwhile, the above operation may not be performed in an environment in which the NAV counter cannot be identified, for example, an environment in which only energy detection (ED) sensing is possible.

When the remaining value is equal to or less than a TSP or a predetermined value, the originator may transmit the short PPDU as well as the original PPDU. In addition, when the channel access to the link 1 is successfully performed, at the same time, the originator may generate a PPDU having a length of (TSP–remaining value). The PPDU may be a PPDU transmitted on the link 2. The PPDU may include duplicated MSDUs to be transmitted through the link 1 or MSDUs for which retransmission requests are received through a block ACK. The originator may align the lengths of the configured PPDUs by transmitting padding data at the PHY layer.

However, before the channel access to the link 2 is successfully performed, the state of the link 2 may become a long busy state. Immediately after the busy state is detected, the originator may discard the previously generated PPDU to be transmitted on the link 2, and at the same time, the originator may generate original PPDUs (i.e., 5~12) and short PPDUs (i.e., 5~8) to be transmitted in the next transmit opportunity of the link 1. The series of exemplary embodiments described so far may be equally applied even when the remaining value exceeds a TSP or a predetermined value as shown in FIG. 21.

In addition, if the channel access to the link 2 is successfully performed before the time when the transmission of the next PPDU starts on the link 1, the originator may delay the transmission even when a backoff counter of the link 2 becomes 0. Accordingly, the originator may simultaneously transmit PPDUs on the link 1 and the link 2. Meanwhile, this method may be performed when the transmission delay value is within a specific value (e.g., SIFS).

FIG. 24 is a conceptual diagram illustrating an exemplary embodiment in which MSDUs having new sequence numbers are included in a PPDU having a length of (TSP–remaining value).

Referring to FIG. 24, in the independent transmission scheme, channel access may be performed on the link 1 and the link 2, respectively. The originator may desire to transmit an original PPDU generated in an EDCA queue on the link 1 before the channel access to the link 1 is successful.

The original PPDU may have a maximum length (TOP) of 5.484 ms (i.e., aPPDUMaxTime). In addition to the original PPDU which has a transmission length of the time of original PPDU (TOP), the communication node may additionally generate a short PPDU having a length of a TSP shorter than the transmission length of the TOP. In addition, the communication node may prepare to transmit the short PPDU. In this case, each of the original PPDU and the short PPDU may be a complete PPDU including a preamble, a QoS data frame, and a BAR. Meanwhile, in case of an implicit BAR mode, the BAR may be omitted.

When the channel access to the link 1 is successfully performed, the originator may identify a remaining value of the link 2 from a start point of the TXOP indicated by a dotted line. Meanwhile, the above operation may not be performed in an environment in which the NAV counter cannot be identified, for example, an environment in which only energy detection (ED) sensing is possible.

When the remaining value is equal to or less than the TSP or a predetermined value, the originator may transmit the short PPDU not the original PPDU. In addition, when the channel access to the link 1 is successfully performed, at the same time, the originator may generate a PPDU having a length of (TSP−remaining value). The PPDU may include MSDUs having new sequence numbers in addition to the MSDU transmitted on the link 1. In FIG. 24, MSDUs having sequence numbers 5 and 6 may be included in the PPDU, and the originator may regenerate PPDUs to be simultaneously transmitted on the link 1 and the link 2 at the next transmit opportunity at the time when the PPDU is generated.

When the channel access to the link 2 is successfully performed, the originator may transmit a regenerated PPDU having a length of (TSP−remaining value) on the link 2. Thereafter, the recipient may duplicate a block ACK and transmit it through multiple links. The originator may synchronize the multiple links at the next transmit opportunity. Thereafter, the originator may simultaneously transmit the regenerated PPDUs.

FIG. 25 is a conceptual diagram illustrating a method for a communication node to generate and transmit PPDUs having various lengths by optimizing the PPDUs. Referring to FIG. 25, before the channel access to the link 1 is performed, the originator may additionally generate a very short PPDU in addition to the original PPDU and the short PPDU, unlike the previous exemplary embodiments. The lengths of the respective PPDUs may be a time of original PPDU (TOP), a time of short PPDU (TSP), and a time of very short PPDU (TVSP).

When the channel access to the link 1 is successfully performed, the originator may calculate a remaining value of the link 2. The originator may transmit the very short PPDU on the link 1 when the remaining value is less than or equal to the TVSP. Also, when the remaining value exceeds the TVSP and is less than the TSP, the originator may transmit the short PPDU on the link 1. In addition, the originator may transmit the original PPDU on the link 1 when the remaining value exceeds the TSP. The originator may perform optimization in the above-described manner. In FIG. 25, it is illustrated that the originator generates three types of PPDUs, but more types of PPDUs may be generated for optimization. Meanwhile, the transmission scheme described with reference to FIG. 25 may be used as an extension of the schemes of the exemplary embodiments described herein.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An access point (AP) multi-link device (MLD) in a communication system, comprising:
   a first AP having a fourth medium access control (MAC) address and operating in a first link of multi-links;
   a second AP having a fifth MAC address and operating in a second link of the multi-links;
   a second MAC service access point (SAP) having a MAC-SAP2 address; and
   a memory storing one or more instructions for controlling operations of the first AP, the second AP, and the second MAC SAP, wherein the one or more instructions execute to:
   receive, by the first AP, a block acknowledgement (BA) agreement request from a station (STA) MLD in the first link among the multi-links, wherein the STA MLD includes a first STA having a first MAC address and operating in the first link of the multi-links, a second STA having a second MAC address and operating in the second link of the multi-links, and a first MAC SAP having a MAC-SAP1 address;
   transmit, by the first AP, a BA agreement response to the STA MLD in the first link among the multi-links;
   configure, by the AP MLD, a buffer for the BA agreement;
   receive, by the first AP, a first data unit from the STA MLD of which a transmitter address (TA) is the first MAC address in the first link among the multi-links;
   receive, by the second AP, a second data unit from the STA MLD of which a TA is the second MAC address in the second link among the multi-links; and
   perform, by the AP MLD, a reordering operation for the first data unit and the second data unit which are stored in the buffer, wherein the buffer is configured for <first MAC SAP, TID> tuple, the first and second data units received from the STA MLD are stored in the buffer for the <first MAC SAP, TID> tuple, the reordering operation is applied to the first and second data units stored in the buffer for the <first MAC SAP, TID> tuple, and the BA agreement is not performed between the second AP and the second STA.

2. The AP MLD according to claim 1, wherein the one or more instructions further execute to:
   transmit, by the first AP, a first BA frame in response to the first data unit in the first link; and
   transmit, by the second AP, a second BA frame in response to the second data unit in the second link, wherein the first BA frame and the second BA frame are transmitted simultaneously.

3. The AP MLD according to claim 1, wherein the BA agreement request is an ADDBA request frame including at least one of the MAC-SAP1 address of the first MAC SAP, the first MAC address of the first STA, or the second MAC address of the second STA from the STA MLD, the first MAC SAP, the first STA, and the second STA being affiliated with the STA MLD, and the BA agreement response is an ADDBA response frame in response to the ADDBA request frame.

4. The AP MLD according to claim 3, wherein the MAC-SAP 2 address is a MAC address representing the AP MLD, and the MAC-SAP1 address is a MAC address representing the STA MLD.

5. The AP MLD according to claim 1, wherein each of the fourth MAC address and the fifth MAC address is a lower MAC address of the MAC-SAP2 address.

6. The first-AP MLD according to claim 1, wherein the reordering operation is performed based on a sequence number (SN) of each of the first data unit and the second data unit.

7. A station (STA) multi-link device (MLD) in a communication system, comprising:

a first STA having a first medium access control (MAC) address and operating in a first link of multi-links;

a second STA having a second MAC address and operating in a second link of the multi-links;

a first MAC service access point (SAP) having a MAC-SAP1 address; and a memory storing one or more instructions for controlling operations of the first STA, the second STA, and the first MAC SAP, wherein the one or more instructions execute to:

transmit, by the first STA, a block acknowledgement (BA) agreement request to an access point (AP) MLD in the first link among the multi-links, wherein the AP MLD includes a first AP having a fourth MAC address and operating in the first link of the multi-links, a second AP having a fifth MAC address and operating in the second link of the multi-links, and a second MAC SAP having a MAC-SAP2 address;

receive, by the first STA, a BA agreement response from the AP MLD in the first link among the multi-links;

configure, by the STA MLD, a buffer for the BA agreement for transmission;

transmit, to the first AP, a first data unit of which a transmitter address (TA) is the first MAC address in the first link;

transmit, to the second AP, a second data unit of which a TA is the second MAC address in the second link among the multi-links;

receive, by the STA MLD, a first BA frame from the AP MLD of which a TA is the fourth MAC address in the first link among the multi-links; and receive, by the STA MLD, a second BA frame from the AP MLD of which a TA is the fifth MAC address in the second link among the multi-links;

wherein the buffer for transmission is configured for the <second MAC SAP, TID> tuple, based on the first BA frame and the second BA frame, an updating operation is applied for the <second MAC SAP, TID> tuple, and the BA agreement is not performed between the second STA and the second AP.

\* \* \* \* \*